(12) United States Patent
Landspurg et al.

(10) Patent No.: US 12,474,100 B2
(45) Date of Patent: Nov. 18, 2025

(54) SYSTEMS AND METHODS OF REMOTE MONITORING OF REFRIGERATION AND COOLING SYSTEMS

(71) Applicant: Dehon SAS, Paris (FR)

(72) Inventors: Thomas Landspurg, Floirac (FR); Florian Willerval, Kremlin Bicetre (FR)

(73) Assignee: Dehon SAS, Paris (FR)

( * ) Notice: Subject to any disclaimer, the term of this patent is extended or adjusted under 35 U.S.C. 154(b) by 217 days.

(21) Appl. No.: 18/231,624

(22) Filed: Aug. 8, 2023

(65) Prior Publication Data
US 2024/0053074 A1 Feb. 15, 2024

Related U.S. Application Data

(60) Provisional application No. 63/396,460, filed on Aug. 9, 2022.

(51) Int. Cl.
*F25B 49/02* (2006.01)
(52) U.S. Cl.
CPC ........ *F25B 49/02* (2013.01); *F25B 2500/222* (2013.01); *F25B 2700/04* (2013.01)
(58) Field of Classification Search
CPC ............ F25B 2500/19; F25B 2500/222; F25B 2600/07; F25B 2600/23; F25B 2700/04; F25B 49/005; F25B 49/02
See application file for complete search history.

(56) References Cited

U.S. PATENT DOCUMENTS 5,684,463 A * 11/1997 Diercks ................... F24F 11/30
340/584
2009/0251324 A1 * 10/2009 Frederick .............. F25B 49/005
340/626

(Continued)

FOREIGN PATENT DOCUMENTS

EP 1 970 651 * 9/2006
EP 1970651 A1 9/2008

OTHER PUBLICATIONS

PCT Application No. PCT/IB2023/000500—International Search Report and Written Opinion dated Jan. 18, 2024.

*Primary Examiner* — Henry T Crenshaw
(74) *Attorney, Agent, or Firm* — Kane Kessler, P.C.; Barry E. Negrin

(57) ABSTRACT

Systems and methods for remote monitoring of refrigeration systems to detect leaks of refrigerant include a local monitoring station, having at least one sensor configured to be in communication with a refrigeration system having refrigerant, the sensor measuring at least one parameter of the refrigeration system. At least one server is in communication with the local monitoring station and accessible by at least one user communication device. Software residing at least partially on the local monitoring station and/or the server: records data from the sensor periodically to generate recorded sensor data; collects the recorded sensor data over time to generate collected sensor data; determines via at least one algorithm, using the collected sensor data, whether a refrigerant leak is occurring in the refrigeration system being monitored to thereby generate a state of the refrigeration system; and communicates the state of the refrigeration system to the at least one server.

27 Claims, 32 Drawing Sheets

(56) References Cited

U.S. PATENT DOCUMENTS

2017/0268811 A1    9/2017  Ochiai et al.
2017/0292725 A1   10/2017  Conley et al.
2018/0363963 A1*  12/2018  Govekar ................. F25B 45/00

* cited by examiner

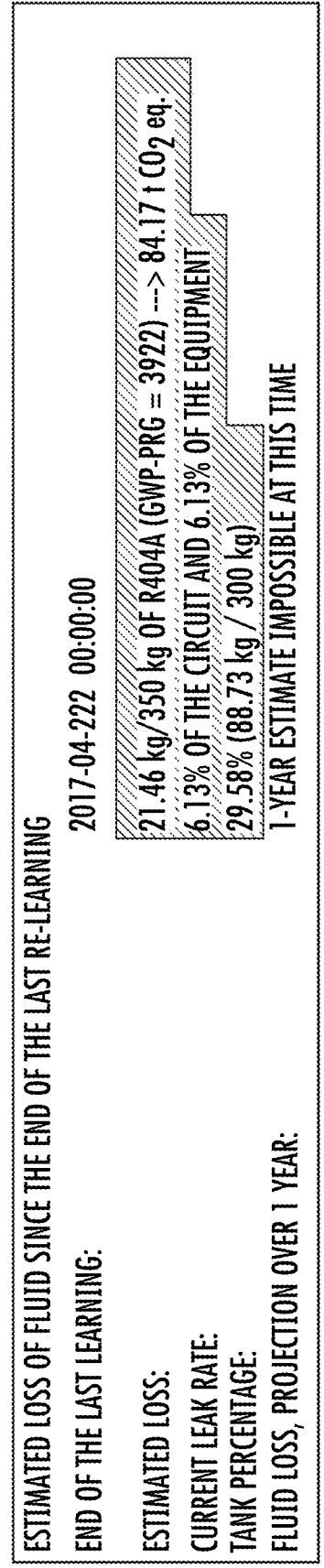

| DATE AND UTC TIME OF RECEIPT ON THE SERVER: | 2017-05-30 00:59:00 |
| --- | --- |
| DATE AND TIME OF THE ALARM ON THE DNI: | 2017-05-30 00:59:00 |
| LOCATION: | |
| REFERENCE: | |
| DNI: | NEGATIVE UNIT R + 1 (588) |
| SETTING: | |
| REFERENCE: | 890544 |
| SETTING: | -3.00 |
| VALUE: | -3.49 |

| ESTIMATED LOSS OF FLUID SINCE THE END OF THE LAST RE-LEARNING | |
| --- | --- |
| END OF THE LAST LEARNING: | 2017-04-222 00:00:00 |
| ESTIMATED LOSS: | 21.46 kg/350 kg OF R404A (GWP-PRG = 3922) --> 84.17 t $CO_2$ eq. |
| CURRENT LEAK RATE: | 6.13% OF THE CIRCUIT AND 6.13% OF THE EQUIPMENT |
| TANK PERCENTAGE: | 29.58% (88.73 kg / 300 kg) |
| FLUID LOSS, PROJECTION OVER 1 YEAR: | 1-YEAR ESTIMATE IMPOSSIBLE AT THIS TIME |

ADD A NEW UNIT - 1/4

INDICATE THE CHARACTERISTICS OF THE UNIT

- ◔ REFRIGERANT
- ◔ TANK
- ◎ CONDENSER - EVAPORATOR

VOLUME OF THE CONDENSER
1229 dm3

COMPRESSOR TYPE
RECIPROCATING ▽

○ FLOATING HP

○ ADAPTIVE LP

○ HEAT RECOVERY

○ WATERING OF CONDENSERS

CONDENSOR TYPE
AIR COOLED CONDENSER ▽

HP SETPOINT
⟨20⟩
15 ———○——— 50

BP SETPOINT
⟨-40⟩
-50 ———○——— 10

[ PREVIOUS ]  [ NEXT ]

◔ COLUMN

FIG. 7A

ADD A NEW UNIT - 1/4

INDICATE THE CHARACTERISTICS OF THE UNIT

◉ REFRIGERANT
│
◉ TANK
│
◉ CONDENSER - EVAPORATOR
│
◉ COLUMN — TYPE OF TANK
           COPPER ▷

DISTANCE BETWEEN TANK TAPS
           1229 dm3

DISTANCE BETWEEN TANK BOTTOM & BOTTOM TAP
           200 mm

PREVIOUS    NEXT

FIG. 7B

ADD A NEW UNIT - 2/4

ASSOCIATE THE CARDS WITH THE CENTRAL UNIT

| MEASUREMENT CARDS | ASSOCIATION | | IDENTIFY |
|---|---|---|---|
| CARD ASSOCIATED WITH PLANT 1 | ⊙ | WEIGHT / HP ▽ | 🔍 IDENTIFY |
| CARD ASSOCIATED WITH PLANT 1 | ⊙ | BP MEASURE ▽ | 🔍 IDENTIFY |

| GPIO CARDS | ASSOCIATION | | IDENTIFY |
|---|---|---|---|
| CARD AVAILABLE | ⊙ | | 🔍 IDENTIFY |
| CARD ASSOCIATED WITH PLANT 1 | ⊙ | | 🔍 IDENTIFY |

↻ REFRESH

CANCEL   PREVIOUS   NEXT

FIG. 7C

ADD A NEW UNIT - 3/4

ASSOCIATE THE PROBES WITH THE MEASUREMENT CARDS

MEASUREMENT CARD 1 - WEIGHT / HP  [ IDENTIFY ]

TERMINAL BLOCK 1 >

PROBE 12390931093 [ INPUT TEMP ▽ ]

PROBE 2309438408Z [ OUTPUT TEMP ▽ ]

TERMINAL BLOCK 2 >

TERMINAL BLOCK 3 >

TERMINAL BLOCK 4 >

MEASUREMENT CARD 2 - BP  [ IDENTIFY ]

TERMINAL BLOCK 1 >

TERMINAL BLOCK 2 >

[ REFRESH ]

CANCEL          [ PREVIOUS ]  [ NEXT ]

FIG. 7D

ADD A NEW UNIT - 4/4

ALARM SETTING

LOW LEVEL ALARM THRESHOLD
26 lbs

LOW LEVEL ALARM DELAY
20 min

◯── ACTIVATE THE SECOND LOW LEVEL THRESHOLD

LOW LEVEL ALARM THRESHOLD
17 lbs

LOW LEVEL ALARM DELAY
20 min

SENSITIVITY OF THE STATISTICAL ALARM ⓘ
● HIGH
○ MODERATE
○ LOW

CANCEL  PREVIOUS  NEXT

FIG. 7E

RELEARNING / RECALCULATE

AFTER ACKNOWLEDGING AN ALARM OR MAKING A CHANGE TO THE CONTROL UNIT OR SOLUTION, THE REFERENCE LEVEL MUST BE ADJUSTED. THERE ARE TWO POSSIBILITIES:

RE LEARNING — TO BE LAUNCHED IN CASE OF MODIFICATION ON THE CENTRAL UNIT (CHANGE OF AN ELEMENT, MODIFICATION OF THE PROGRAMMING,...) OR ON THE SOLUTION (TARE, MODIFICATION OF THE GAUGE,...)

RECALCULATION — TO BE LAUNCHED IN CASE OF MODIFICATION ON THE CENTRAL UNIT (CHANGE OF AN ELEMENT, MODIFICATION OF THE PROGRAMMING,...) OR ON THE SOLUTION (TARE, MODIFICATION OF THE GAUGE,...)

☐ START A RECALCULATION/LEARNING AFTER A LEAK

SOME ACTIONS MAY BE USEFUL TO ENSURE PROPER FUNCTIONING.    THE TARE MUST BE DONE AT LEAST ONCE A YEAR.

[ TARE ]

[ DECLARE A REFILL ]

CLOSE

FIG. 10C

ACKNOWLEDGE ALL ALARMS?

3 ALARMS WILL BE ACKNOWLEDGED AFTER THIS ACTION.

| ALARM TYPE | DESCRIPTION | START DATE |
|---|---|---|
| MEASUREMENT CARD FAILURE | | 16/06/2023 00:14 |
| MEASUREMENT CARD FAILURE | | 11/05/2023 20:14 |
| GPIO CARD FAILURE | | 10/05/2023 14:54 |

HIDE DETAIL

☐ I CONFIRM THAT ALL LEAK HAVE BEEN REPAIRED

CLOSE   ACKNOWLEDGE

FIG. 10D

| EVENT LOG | | | | ✕ |
|---|---|---|---|---|
| FILTER EVENTS: SELECTED (1) ▽ | | | PERIOD: MAY 2, 2019 - NOW ▽ | |
| HORODATAGE | TYPE OF EVENT | # | DESCRIPTION | INFORMATION |
| 16/11/2020 00:00:35 | STARTING THE POLARBOX | 4 | PROGRAM VERSION V10.02.07 | → |
| 16/11/2020 00:00:35 | STATISTICAL ALARM | 12 | HIGH | → |
| 16/11/2020 00:00:35 | DISCONNECTING THE POLARBOX | 3 | | → |
| 16/11/2020 00:00:35 | STARTING THE POLARBOX | 4 | PROGRAM VERSION V10.02.07 | → |
| 16/11/2020 00:00:35 | DISCONNECTING THE POLARBOX | 3 | | → |
| 16/11/2020 00:00:35 | SLOW CONNECTION | 3 | PROGRAM VERSION V10.02.07 | → |
| 16/11/2020 00:00:35 | NORMAL | 1 | PROGRAM VERSION V10.02.07 | → |
| 16/11/2020 00:00:35 | NORMAL | 1 | PROGRAM VERSION V10.02.07 | → |
| 16/11/2020 00:00:35 | NORMAL | 1 | PROGRAM VERSION V10.02.07 | → |

ROWS PER PAGE: 5    ▽1-10 OF 100    < >

[CLOSE]

FIG. 10G

SYSTEMS AND METHODS OF REMOTE MONITORING OF REFRIGERATION AND COOLING SYSTEMS

RELATED APPLICATIONS

Priority is claimed from U.S. Provisional Patent Application No. 63/396,460 filed Aug. 9, 2022 and entitled "Systems and Methods of Remote Monitoring of Refrigeration and Cooling Systems", the entirety of which is incorporated by reference herein.

BACKGROUND OF THE INVENTION

Field of the Invention

The invention is directed to systems and methods of monitoring refrigeration and cooling systems. More specifically, the invention is directed to systems and methods of monitoring refrigeration and cooling systems for leaks of refrigerant and overall performance.

Description of Related Art

It is critical to maintain refrigeration and cooling systems at peak efficiency. One reason is that they require a lot of electricity to run even under optimal conditions, so it is important to avoid their running at below optimal conditions and thus requiring additional power. Another reason is that many such systems rely on a refrigerant, such as R-404a, R-134a, R-22, or similar refrigerants. No system of any kind perfectly contains its refrigerant, and the refrigerant often leaks. This is problematic for two reasons. First, loss of refrigerant negatively affects system performance. Second, these chemicals are both greenhouse gases and in some cases ozone-depleting substances as well. Keeping them contained is extremely important.

Existing leak detection systems fall short. One type of conventional leak detection is a direct detection system via ambient monitors that analyze the concentration of refrigerant particles in the air. If the refrigerant is detected at certain levels ambiently, it is clear that a leak is occurring. Although effective, it has its limits because it requires the installation of a multitude of sensors that can be influenced by air currents or poor location.

Another direct detection method uses portable leak detectors which allow a physical analysis of the installation by manually moving the detector around the installation, the pipework, etc. This is a time-consuming method that does not rule out missing a leak if the detector does not pass by the right spot at the right time.

Another direct detection method uses a fluorescent tracer or foaming agent to visually identify a leak. This involves the same difficulties as the portable leak detector and does not guarantee that all leaks will be found.

The above methods are used for periodic checks according to the tons of CO2 equivalent contained in the installations and do not allow for continuous and remote monitoring as they only alert on site. They do not allow remote access to the installation's operating data and are reduced to local leak detection that does not ensure the overall tightness of the system.

For other indirect methods, the measurements are sometimes incomplete and do not make it possible to ascertain the actual presence of a leak. The linked interface provides very little information on the operation of remote equipment, with few analysis tools or tools dedicated to improving system performance and reducing direct and indirect greenhouse gas emissions (leaks and energy). With only local systems, it is impossible to do a first diagnostic remotely. A technician needs to go on site.

With leakage rates of 20 to 30% (source EPA: https://www.epa.gov/section608/stationary-refrigeration-leak-repair-requirements) and energy consumption representing 50% of the final consumption of a supermarket, there is a strong potential for optimizing the operation of refrigeration facilities. Today, there are very few devices that allow a detailed analysis of the behavior of the installations.

SUMMARY OF THE INVENTION

The above and other objects are achieved by the invention, which includes systems and methods for remote monitoring of refrigeration and cooling systems.

In one embodiment, the invention is a system for remote monitoring of refrigeration and cooling systems to detect leaks of refrigerant. A local monitoring station has at least one sensor configured to be in communication with a refrigeration system having refrigerant, the sensor measuring at least one parameter of the refrigeration system, the local monitoring station further having at least one local processor. At least one server is remote from and in communication with the local monitoring station and accessible by at least one user communication device via communication channels. Software resides at least partially on the local monitoring station. The at least one local processor is configured to execute the software to cause the local monitoring station to: record data from the at least one sensor periodically to generate recorded sensor data; collect the recorded sensor data over time to generate collected sensor data; determine via at least one algorithm, using the collected sensor data, whether a refrigerant leak is occurring in the refrigeration system being monitored to thereby generate a state of the refrigeration system; and communicate the state of the refrigeration system to the at least one server.

The at least one server may preferably send at least one message to the at least one user communication device via the communication channels, the at least one message pertaining to the state of the refrigeration system. The at least one sensor may preferably measure a quantity of refrigerant in the refrigeration system.

Optionally, the at least one sensor includes a weight sensor connected to an external column in fluid communication with a main refrigerant tank, wherein a weight of the column is indicative of a refrigerant level in the main refrigerant tank, the at least one parameter comprising the weight of the column. Optionally, the weight sensor includes a strain gauge.

The at least one sensor may further include a temperature sensor measuring the refrigerant output temperature of the main refrigerant tank. The software may further cause the local monitoring station to: determine a density of the refrigerant using the output temperature; calculate a refrigerant height in the main refrigerant tank using at least column volume, column weight, and the density; calculate a main refrigerant tank weight using tank type, the calculated refrigerant height, the density, and tank diameter; and compare the calculated main refrigerant tank weight with a predetermined low-level limit. If the calculated main refrigerant tank weight is less than the predetermined low-level limit, a low-level alarm is sent from the local monitoring station to the server and thence to the at least one user communication device.

Optionally, the software may further cause the local monitoring station to: determine whether a slope of the collected sensor data over a time period calculated via a linear function is below a predetermined statistical threshold; and send a statistical alarm from the local monitoring station to the server and thence to the at least one user communication device if the slope is below the predetermined statistical threshold.

Optionally, the software may further cause the local monitoring station to aggregate refrigerant levels over a plurality of time periods of differing sizes. Shorter time periods are used to identify leaks with a lower amplitude, and longer time periods are used to identify leaks with a higher amplitude. Optionally, for each of at least a plurality of the time periods, the software further causes the local monitoring station at least to determine at least one of the following a), b), or c): a) whether a difference in refrigerant level between the start and the end of a given the time period is greater than a fixed threshold; b) whether a difference in level between the start and the end of the period, and the relative maximum volume of a main refrigerant tank, is greater than a fixed threshold; or c) whether a share of decline relative to all levels is greater than a fixed threshold. The software further causes the local monitoring station to determine d) that a drop in refrigerant level is not due to a point discontinuity. An alarm is generated if at least one of a)—c) and d) occur.

The invention also includes a method of remote monitoring of refrigeration systems to detect leaks of refrigerant. One embodiment of the inventive method includes the following steps: providing at least one sensor in communication with a refrigeration system having refrigerant; measuring, via the sensor, at least one parameter of the refrigeration system; recording data from the at least one sensor periodically on a location monitoring station having at least one local processor, thereby generating recorded sensor data; collecting the recorded sensor data over time on the local monitoring station, thereby generating collected sensor data; determining via the local processor using at least one algorithm and using the collected sensor data whether a refrigerant leak is occurring in the refrigeration system being monitored, thereby generating a state of the refrigeration system; communicating the state of the refrigeration system from the local monitoring station to at least one server; and sending, from the at least one server, at least one message to at least one user communication device via communication channels, the at least one message pertaining to the state of the refrigeration system.

Preferably, the measuring step further includes the step of measuring a quantity of refrigerant in the refrigeration system. The at least one sensor may include a weight sensor connected to an external column in communication with a main refrigerant tank, in which case the measuring step further includes the step of measuring a weight of the column, wherein the weight of the column is indicative of a refrigerant level in the main refrigerant tank.

The measuring step may further include the step of a temperature sensor measuring the refrigerant output temperature of the main refrigerant tank with a temperature sensor, the method further including the steps of: determining a density of the refrigerant using the output temperature; calculating the refrigerant height in the main refrigerant tank using at least column volume, column weight, and the density; calculating a main refrigerant tank weight using tank type, the calculated refrigerant height, the density, and the tank diameter; and comparing the calculated main refrigerant tank weight with a predetermined low-level limit. A low-level alarm may be sent from the local monitoring station to the server and thence to at least one user communication device if the calculated main refrigerant tank weight is less than the predetermined low-level limit.

The method may further include the steps of: determining whether a slope of the collected sensor data over a time period calculated via a linear function is below a predetermined statistical threshold; and sending a statistical alarm from the local monitoring station to the server and thence to the at least one user communication device if the slope is below the predetermined statistical threshold.

The method may further include the steps of: aggregating refrigerant levels over a plurality of time periods of differing sizes via the local processor; using shorter of the time periods to identify leaks with a lower amplitude; and using longer of the time periods to identify leaks with a higher amplitude. For each of at least a plurality of the time periods, the method may further include: at least one of steps a), b, or c): a) determining whether a difference in refrigerant level between the start and the end of a given the time period is greater than a fixed threshold; b) determining whether a difference in level between the start and the end of the period, and the relative maximum volume of the main refrigerant tank, is greater than a fixed threshold; or c) determining whether a share of decline relative to all levels is greater than a fixed threshold. The method may further include the steps of: d) determining that a drop in refrigerant level is not due to a point discontinuity; and e) generating an alarm if at least one of a)-c) and d) occur.

In another embodiment, the invention includes a system for remote monitoring of refrigeration systems. A local monitoring station has at least one sensor configured to be in communication with a refrigeration system having refrigerant, the sensor measuring at least one parameter of the refrigeration system; the local monitoring station further has at least one local processor. At least one server, remote from and in communication with the local monitoring station and accessible by at least one user communication device via communication channels, has at least one remote processor. Software resides at least partially on at least one of the local monitoring station or the server, wherein at least one of the at least one local processor or the least one remote processor are configured to execute the software to cause the system to: record data from the at least one sensor periodically to generate recorded sensor data; collect the recorded sensor data over time to generate collected sensor data; determine via at least one algorithm, using the collected sensor data, a status of the at least one parameter to thereby generate a state of the refrigeration system; and communicate the state of the refrigeration system to the at least one user communication device. Optionally, the at least one server sends at least one message to the at least one user communication device via the communication channels, the at least one message pertaining to the state of the refrigeration system. The at least one sensor optionally, measures a quantity of refrigerant in the refrigeration system.

Optionally, the at least one sensor includes a weight sensor connected to an external column in fluid communication with a main refrigerant tank, wherein a weight of the column is indicative of a refrigerant level in the main refrigerant tank, the at least one parameter comprising the weight of the column.

The at least one sensor may further include a temperature sensor measuring the refrigerant output temperature of the main refrigerant tank. The software may further cause the system to: determine a density of the refrigerant using the output temperature; calculate a refrigerant height in the main refrigerant tank using at least the density; calculate a main refrigerant tank weight using tank type, the calculated refrigerant height, the density, and tank diameter; and compare the calculated main refrigerant tank weight with a predetermined low-level limit. If the calculated main refrigerant tank weight is less than the predetermined low-level limit, a low-level alarm is optionally sent from at least one of the local monitoring station or the server and thence to the at least one user communication device.

Optionally, the software further causes the system to: determine whether a slope of the collected sensor data over a time period calculated via a linear function is below a predetermined statistical threshold; and send a statistical alarm from at least one of the local monitoring station or the server and thence to the at least one user communication device if the slope is below the predetermined statistical threshold.

Optionally, the software further causes the system to aggregate refrigerant levels over a plurality of time periods of differing sizes, wherein shorter of the time periods are used to identify leaks with a lower amplitude, and wherein longer of the time periods are used to identify leaks with a higher amplitude. For each of at least a plurality of the time periods, the software further causes the system at least to determine at least one of the following a), b), or c): a) whether a difference in refrigerant level between the start and the end of a given the time period is greater than a fixed threshold; b) whether a difference in level between the start and the end of the period, and the relative maximum volume of a main refrigerant tank, is greater than a fixed threshold; or c) whether a share of decline relative to all levels is greater than a fixed threshold; and the software further causes the local monitoring station to determine d) that a drop in refrigerant level is not due to a point discontinuity, wherein an alarm is generated if at least one of a)-c) and d) occur.

In another embodiment, the invention includes a method of remote monitoring of refrigeration systems. At least one sensor is provided in communication with a refrigeration system having refrigerant. At least one parameter of the refrigeration system is measured via the at least one sensor. Data is recorded from the at least one sensor periodically on at least one of a location monitoring station having at least one local processor or at least one remote server in communication with the local monitoring station and having at least one remote processor, thereby generating recorded sensor data. The recorded sensor data is collected over time on at least one of the local monitoring station and the at least one remote server, thereby generating collected sensor data. At least one of the local processor or the remote processor using at least one algorithm and using the collected sensor data determines a status of the at least one parameter, thereby generating a state of the refrigeration system. At least one message is sent from at least one of the local monitoring station or the at least one server to at least one user communication device via communication channels, the at least one message pertaining to the state of the refrigeration system.

Optionally, the measuring step further includes the step of measuring a quantity of refrigerant in the refrigeration system. Optionally, the at least one sensor includes a weight sensor connected to an external column in communication with a main refrigerant tank, the measuring step further including the step of measuring a weight of the column, wherein the weight of the column is indicative of a refrigerant level in the main refrigerant tank.

Optionally, the measuring step further includes the step of a temperature sensor measuring the refrigerant output temperature of the main refrigerant tank with a temperature sensor. The method may further include the steps of: determining a density of the refrigerant using the output temperature; calculating the refrigerant height in the main refrigerant tank using at least the density; calculating a main refrigerant tank weight using tank type, the calculated refrigerant height, the density, and the tank diameter; and comparing the calculated main refrigerant tank weight with a predetermined low-level limit. The method may further include the step of sending a low-level alarm from at least one of the local monitoring station or the at least one remote server and thence to at least one user communication device if the calculated main refrigerant tank weight is less than the predetermined low-level limit.

Optionally, the method may further include the steps of: determining whether a slope of the collected sensor data over a time period calculated via a linear function is below a predetermined statistical threshold; and sending a statistical alarm from at least one of the local monitoring station or the at least one remote server and thence to the at least one user communication device if the slope is below the predetermined statistical threshold.

Optionally, the method may further include the steps of: aggregating refrigerant levels over a plurality of time periods of differing sizes via at least one of the local processor or the remote processor; using shorter of the time periods to identify leaks with a lower amplitude; and using longer of the time periods to identify leaks with a higher amplitude. For each of at least a plurality of the time periods, the method may further include at least one of steps a), b, or c): a) determining whether a difference in refrigerant level between the start and the end of a given the time period is greater than a fixed threshold; b) determining whether a difference in level between the start and the end of the period, and the relative maximum volume of the main refrigerant tank, is greater than a fixed threshold; or c) determining whether a share of decline relative to all levels is greater than a fixed threshold. The method may further include the steps of determining that a drop in refrigerant level is not due to a point discontinuity; and e) generating an alarm if at least one of a)-c) and d) occur.

The invention is dedicated to the centralized and remote monitoring of refrigeration systems. With periodic measurements preferably every five seconds and algorithmic learning, it simplifies the management of refrigeration installations, improves their performance, and drastically reduces their environmental impact.

Unlike the ambient air detection system and other direct measurement systems, the instant invention, on the other hand, allows you to place yourself inside the installation via an indirect measurement method, guaranteeing effective leak detection without external disturbances.

BRIEF DESCRIPTION OF THE DRAWINGS

FIG. 3 is an exemplary screenshot of an email sent by the system in accordance with an embodiment of the invention.

FIG. 6A is an exemplary screenshot of a web application dashboard in accordance with an embodiment of the invention.

FIG. 6F is an exemplary screenshot of an equipment performance page of a web application dashboard in accordance with an embodiment of the invention.

FIG. 7A is an exemplary screenshot of configuring a monitoring system in accordance with an embodiment of the invention.

FIG. 7B is an exemplary screenshot of configuring a monitoring system in accordance with an embodiment of the invention.

FIG. 7C is an exemplary screenshot of configuring a monitoring system in accordance with an embodiment of the invention.

FIG. 7D is an exemplary screenshot of configuring a monitoring system in accordance with an embodiment of the invention.

FIG. 7E is an exemplary screenshot of configuring a monitoring system in accordance with an embodiment of the invention.

FIG. 10C is an exemplary screenshot of a recalculate module of a local monitoring station in accordance with an embodiment of the invention.

FIG. 10D is an exemplary screenshot of an acknowledge module of a local monitoring station in accordance with an embodiment of the invention.

FIG. 10G is an exemplary screenshot of an event log of a local monitoring station in accordance with an embodiment of the invention.

DETAILED DESCRIPTION

Figure 1A:
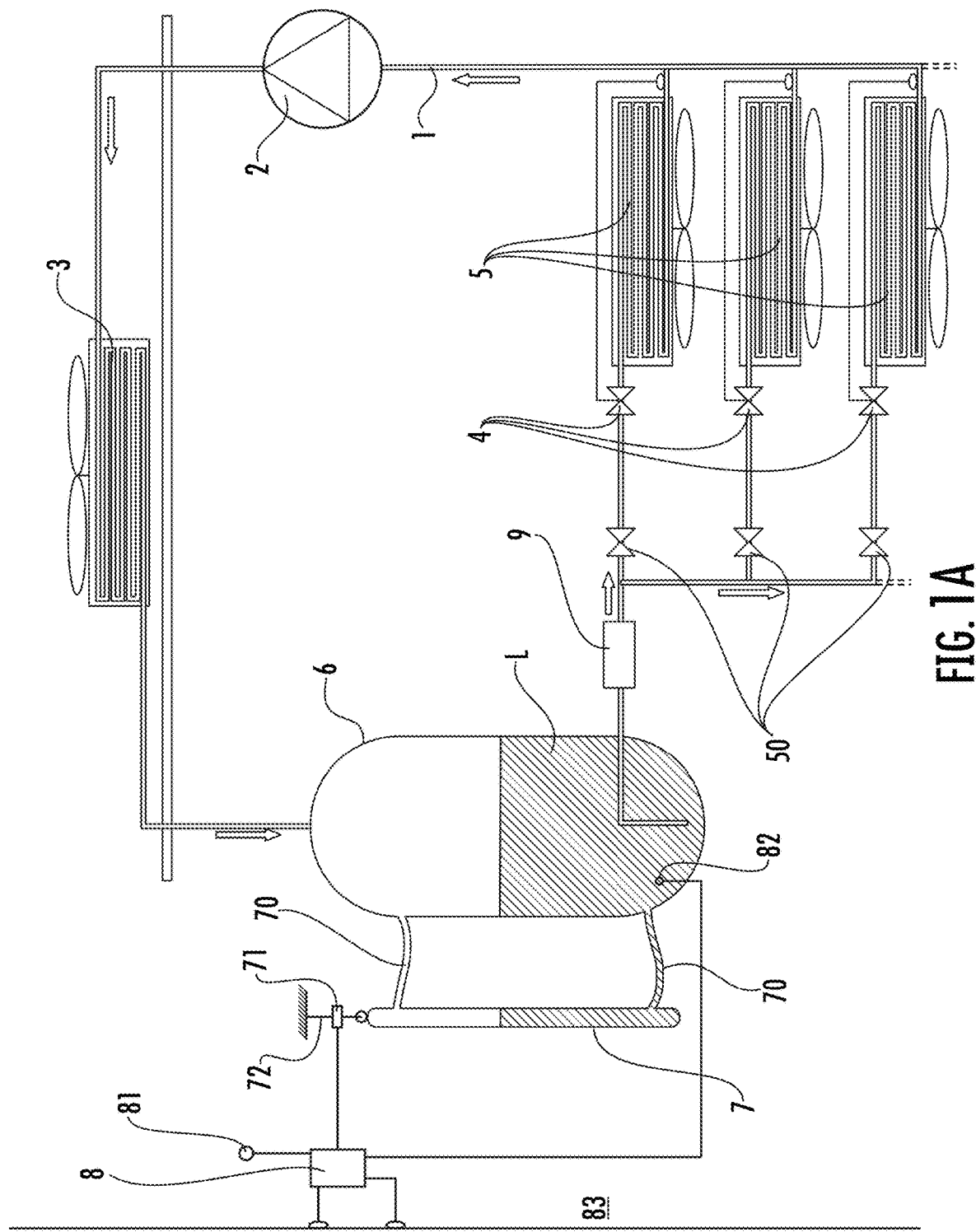
FIG. 1A is a schematic of a refrigerant measuring system.
Figure 1B:
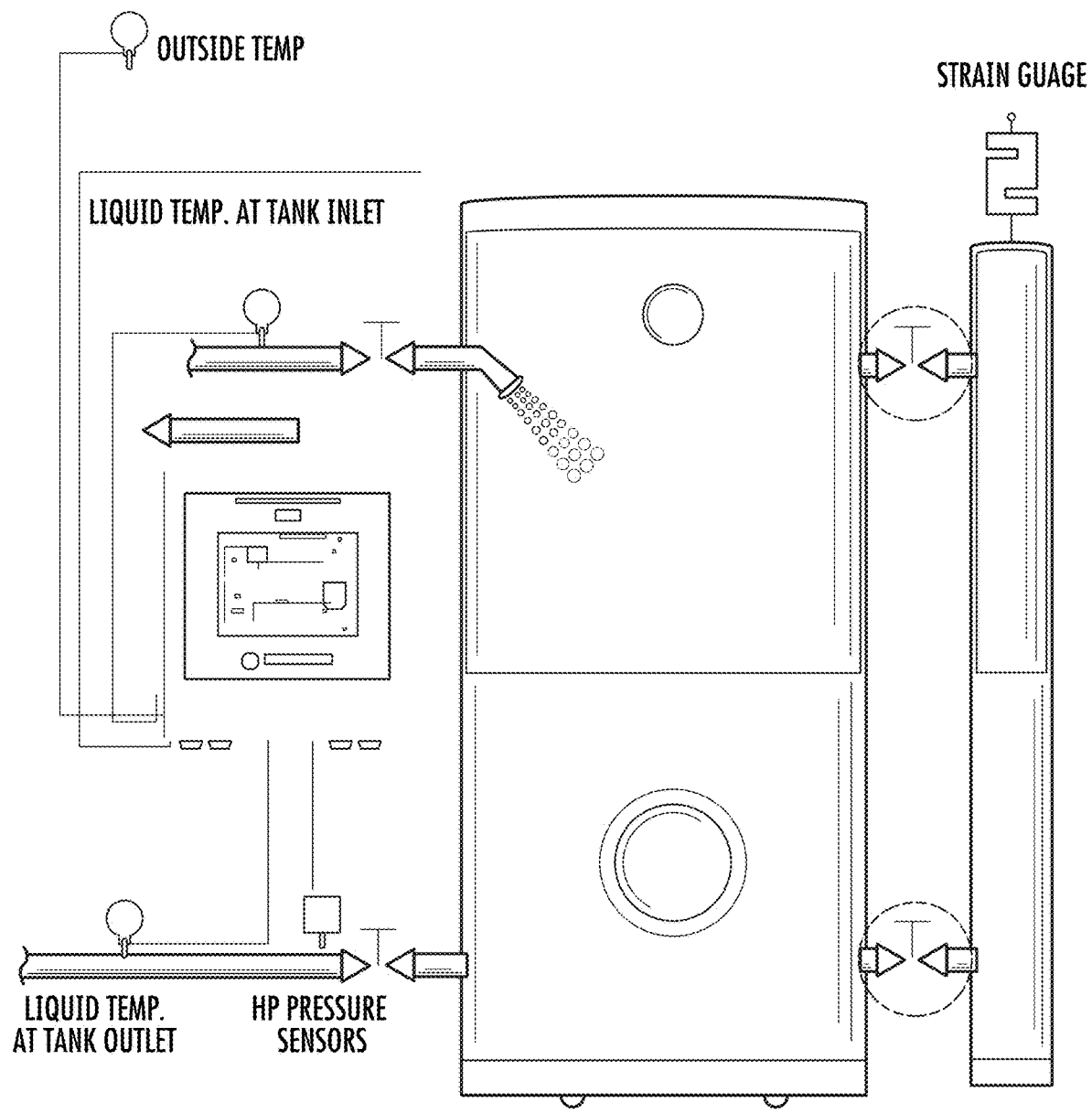
FIG. 1B is a schematic of a refrigerant measuring system including a local IoT device in accordance with an embodiment of the invention.
Figure 1C:
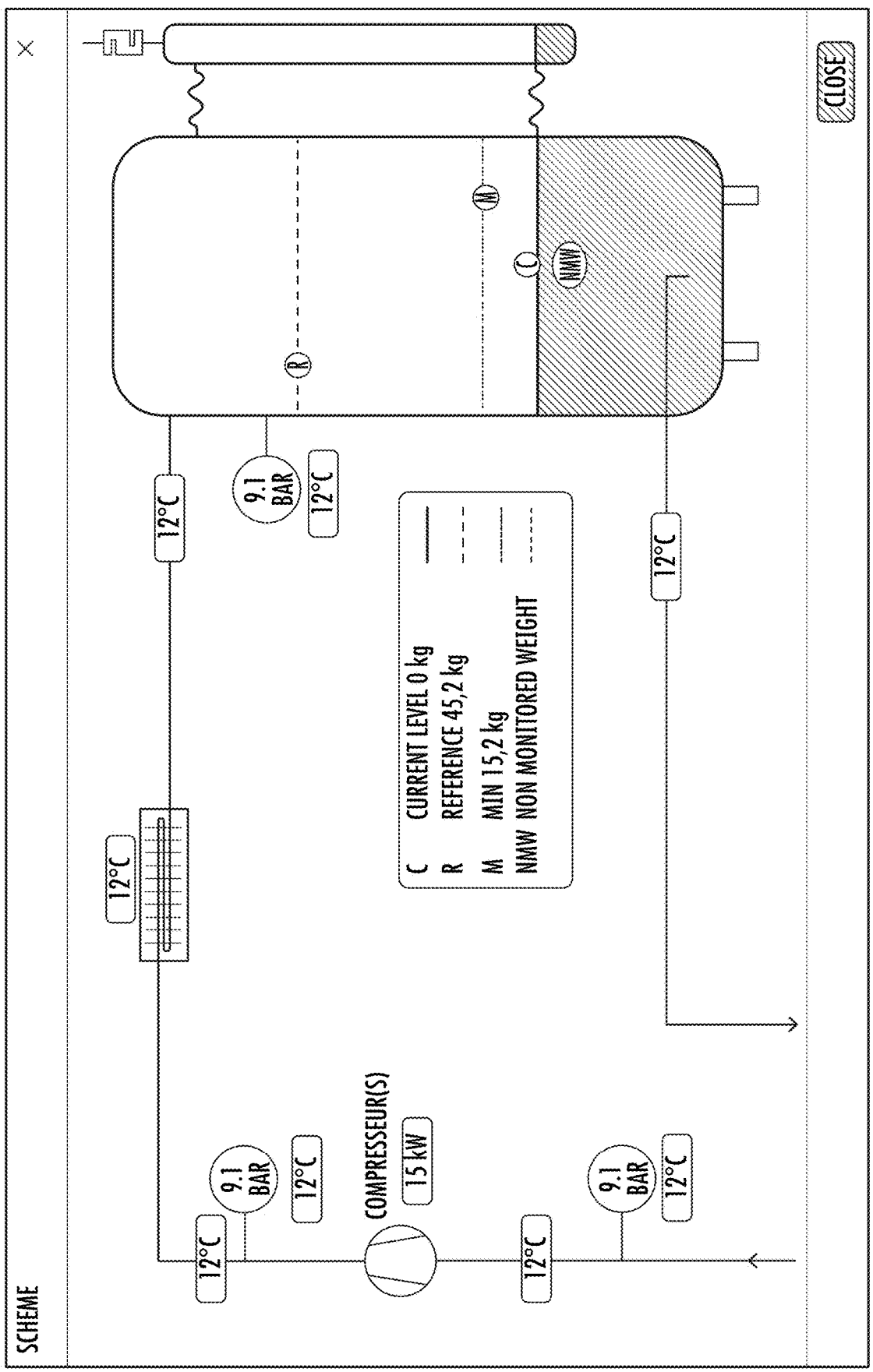
FIG. 1C is a schematic of a refrigerant measuring system in accordance with an embodiment of the invention that depicts the column and the measurements being taken.
Figure 2A:
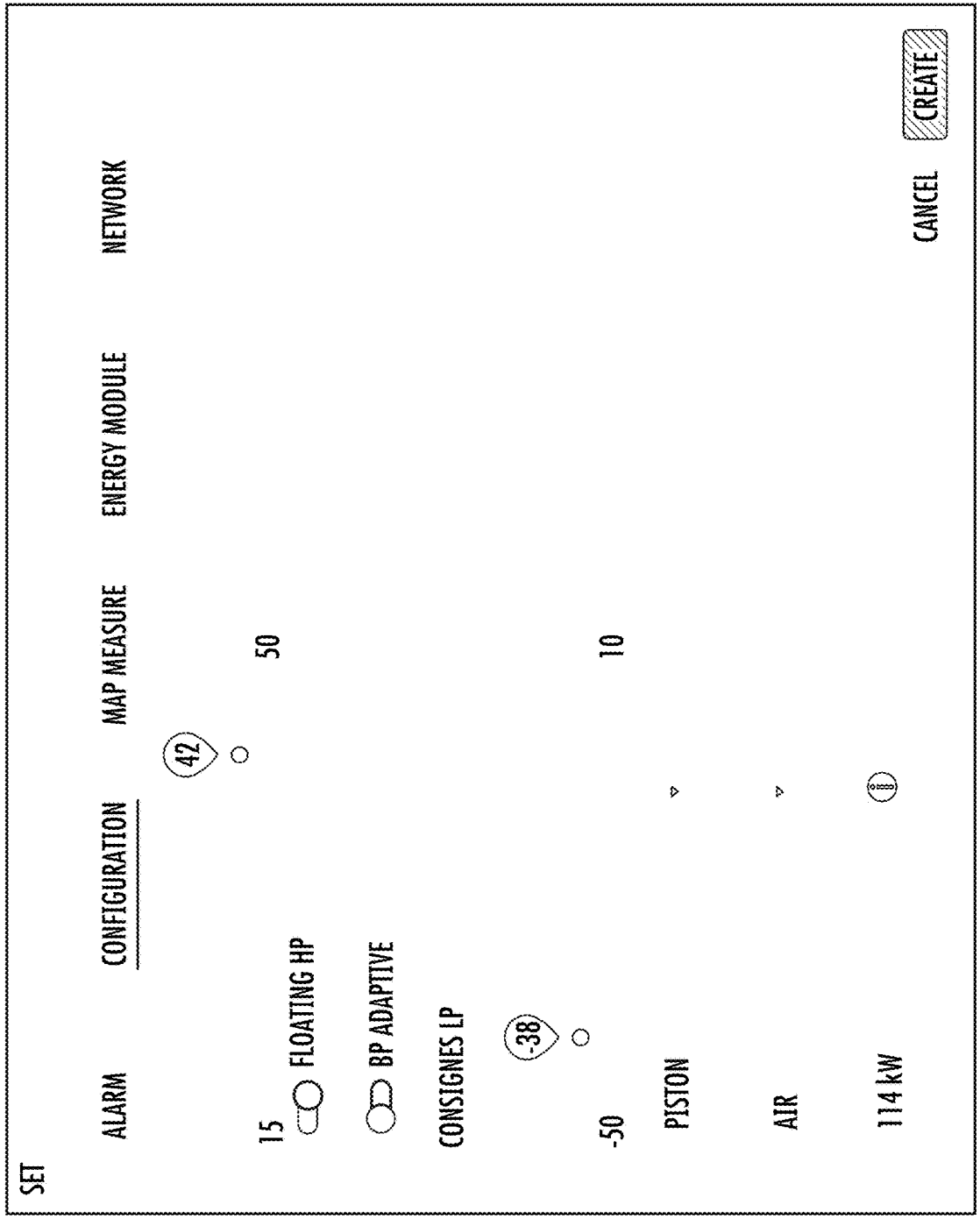
FIG. 2A is an exemplary screenshot of remote parametrization of the local IoT with the centralized system in accordance with an embodiment of the invention.
Figure 2B:
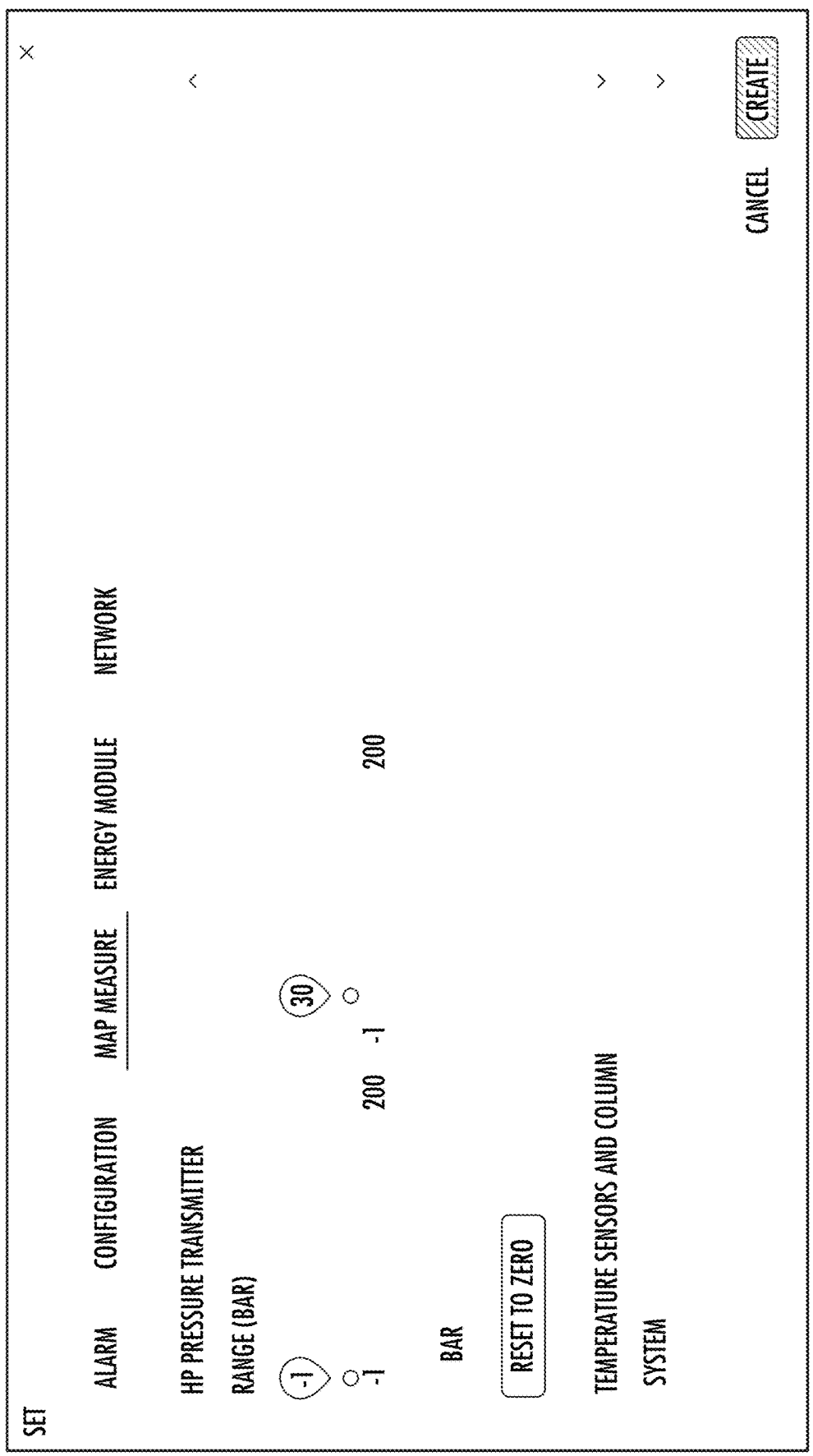
FIG. 2B is another exemplary screenshot of remote parametrization of the local IoT with the centralized system in accordance with an embodiment of the invention.
Figure 2C:
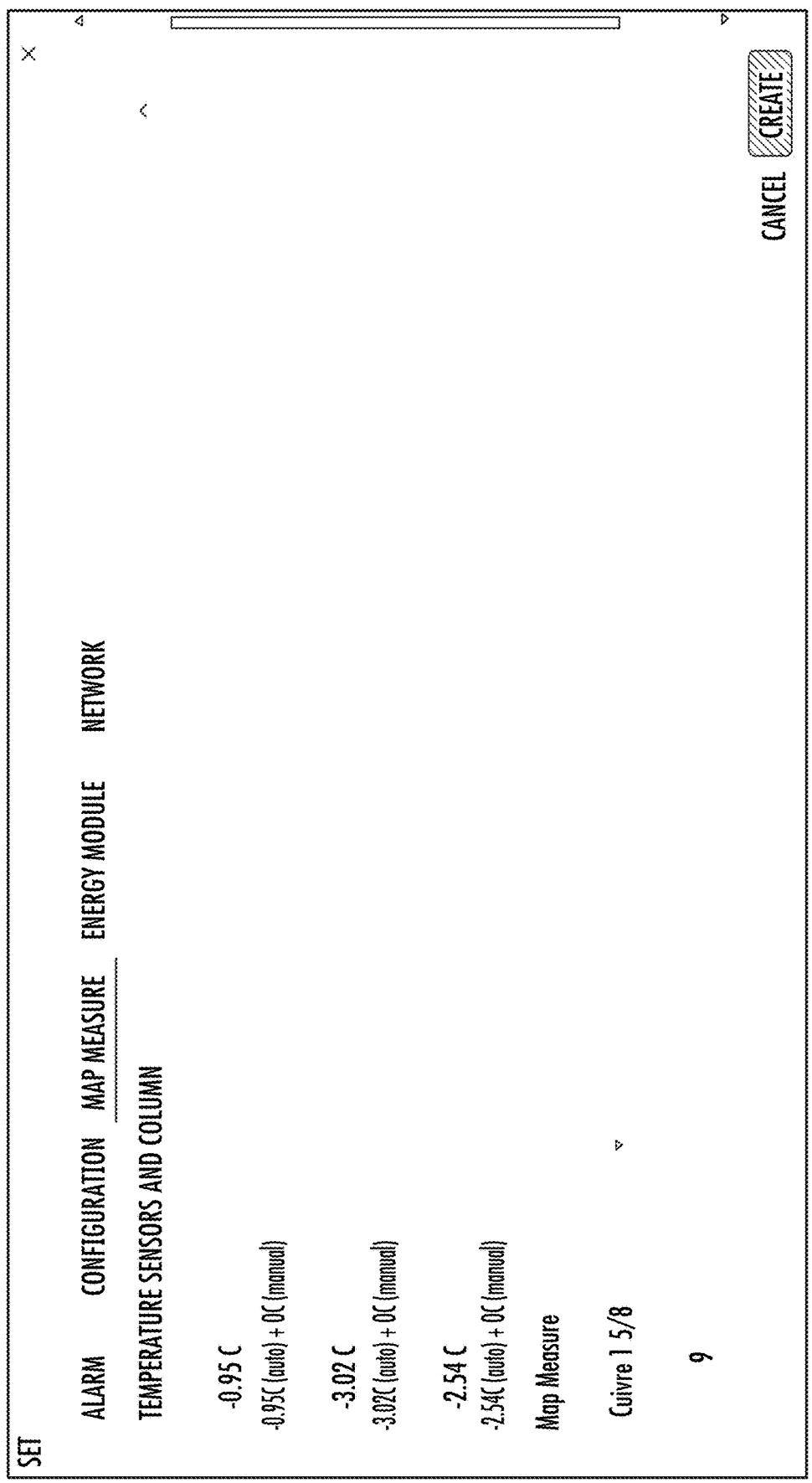
FIG. 2C is another exemplary screenshot of remote parametrization of the local IoT with the centralized system in accordance with an embodiment of the invention.
Figure 4A:
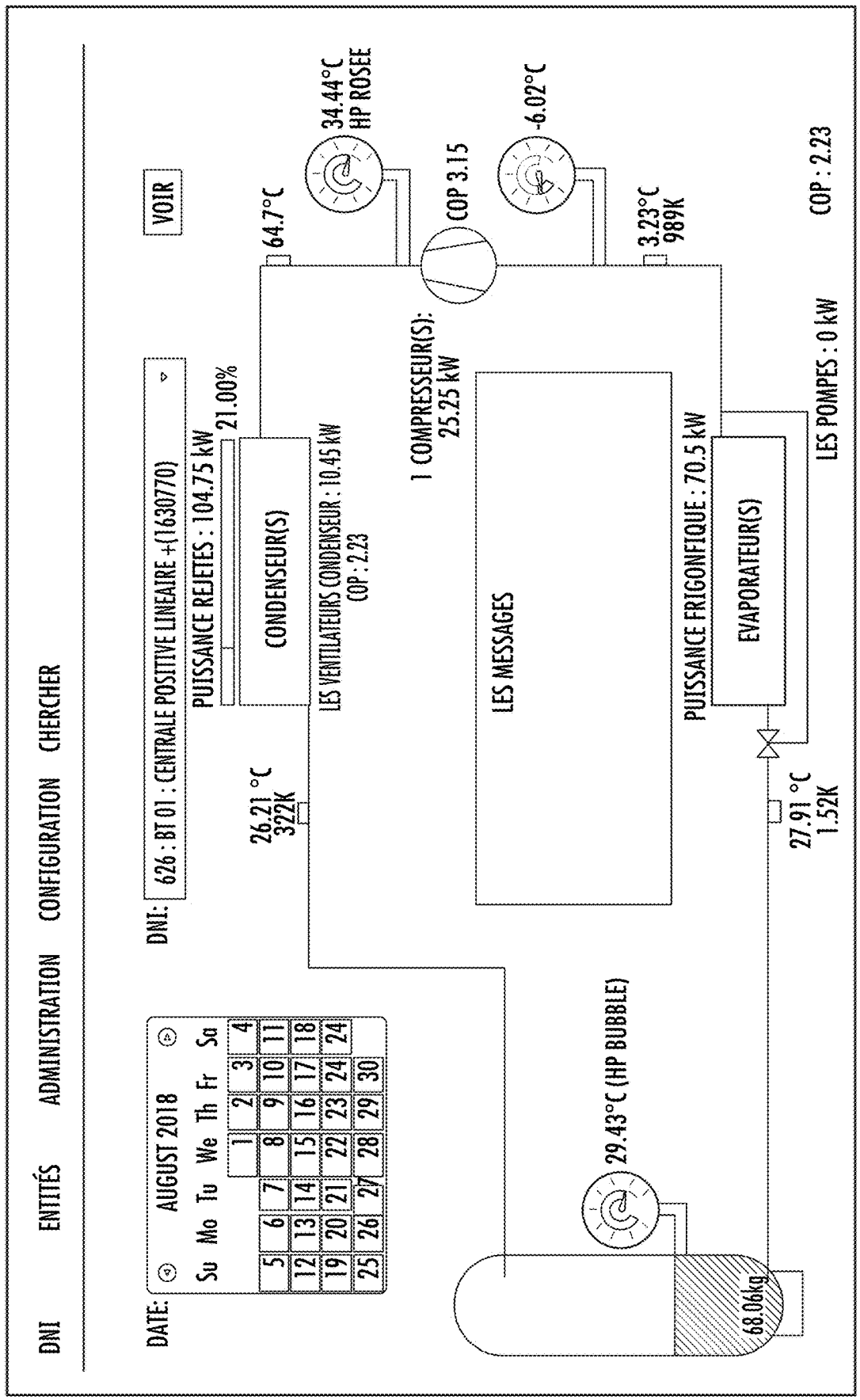
FIG. 4A is an exemplary screenshot of a graphical interface system diagram in accordance with an embodiment of the invention.
Figure 4B:
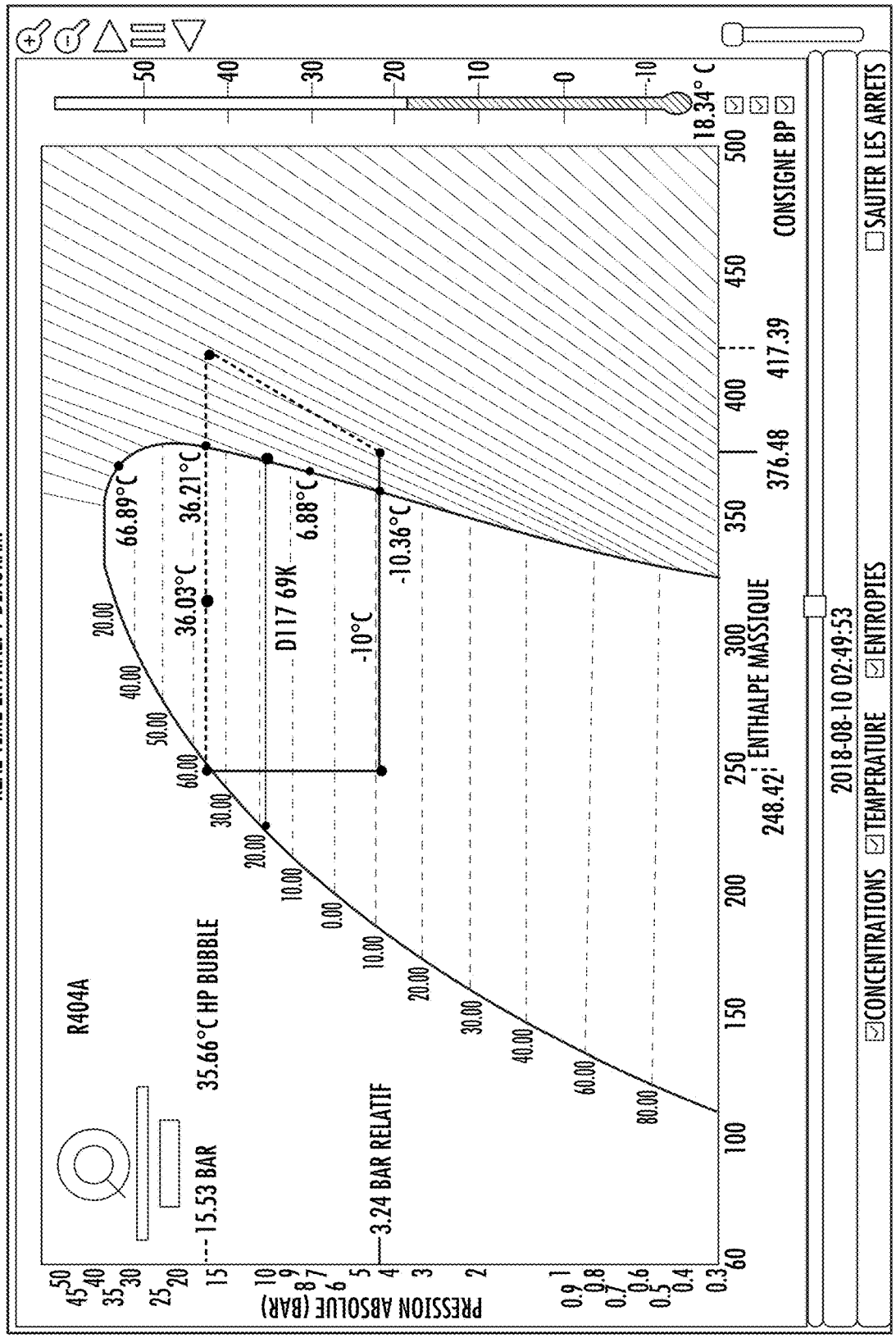
FIG. 4B is an exemplary screenshot of a graphical interface real time enthalpy diagram in accordance with an embodiment of the invention.

Description will now be given with reference to the attached FIGS. 1-11. It should be understood that these figures are exemplary in nature and in no way serve to limit the scope of the invention, which is defined by the claims appearing hereinbelow.

The two main components of the inventive system are a local monitoring device 200 and a web platform connected thereto. With measurements taken preferably every 5 seconds and data analysis tools, the local monitoring device 200 is able to learn the normal operation of an installation in order to identify drifts and alert operators. Capable of monitoring multiple refrigeration units simultaneously, the local monitoring device 200 works on all types of tanks of all refrigerants.

The web platform of the system is accessible from a smartphone, tablet, or computer and contains all the operating data of the installations as well as key indicators that simplify the management of refrigeration installations while reducing direct and indirect greenhouse gas emissions. A complete dashboard (as shown, e.g., in FIGS. 6A-F) allows the user to find all the installations under management but also provides alerts, reminders, and advice to improve the performance of the installations. With an independent and secure connection, the inventive solution simplifies and improves the management of a fleet of installations.

In greater detail, the system is based on two major components: a local connected IoT device 200 and a server 300 with software used to collect analyze and report local sensor data. The system works on all installations with a liquid receiver, with all refrigerants. Several measurement cards can be connected to the IoT device, measuring multiple parameters of the systems (including but not limited to pressures, temperatures at tank inlet and outlet, external temperatures, refrigerant weight and level, etc.) to provide information to the local IoT device. See, e.g., FIG. 1B. After a learning period of the normal operation of the system, a local treatment is made via at least one algorithm described below based on this data to define if the current weight is considered as "normal" in the usage of the cooling system or if the system is leaking.

All these data are also sent in real time to a centralized system. Based on this information, the centralized system can use an extended algorithm to provide more information but also allows a technician to remotely interact with the system in order to qualify and quantify the problem before moving on site, or adapt settings and leak detection sensitivity. An extended leak detection algorithm is a detection algorithm that may require more computing power or more data than is available on the local device, for instance a machine learning algorithm based on similar data from another local IoT device.

The modularity of the system allows the usage of different types of methods to detect leaks: e.g., using a preferred indirect weight system developed by Matelex of Paris, France, or other type of fluid level computation (e.g., ultrasound, or others). The Matelex system is based on a mobile column connected to the main tank though two connectors: one on the top of the column and one on the bottom. The level of the fluid in the column is the same as the level of fluid in the tank. The system measures the weight of this mobile column, and compute from this the volume of the fluid in the main tank. See, e.g., FIGS. 1A and 1C.

As shown in FIG. 1A, a typical refrigeration system 40 usually comprises a circuit 1, a compressor 2, a condenser 3, expander 4, and an evaporator 5, in this case several supplied in parallel. Furthermore, the refrigeration plant comprises a refrigerant reservoir 6 of refrigerant L disposed on the circuit 1 downstream of the condenser 3. Depending on the needs, one or more evaporators 5 are used, which is achieved through the control of solenoid valves 50 that equip the circuit 1 upstream of each of the evaporators 5. It will be understood that depending on the number of evaporators 5 used, the amount of refrigerant L contained in the reservoir 6 varies. It is of course expected that this amount of refrigerant L is sufficient to cope with the extreme case of simultaneous use of all evaporators 5. However, this amount may not be sufficient in case of leakage of the circuit 1, and it can present a risk to the user of the installation.

The detection of a leak, whatever the operation of the installation, requires knowing the level of filling of the tank 6. In one example, as shown in FIG. 1A, the reservoir 6 is associated with an external column 7, arranged vertically and connected to the reservoir 6 through flexible conduits 70, for balancing the levels of refrigerant L.

The column 7 is held by support means, in this case suspension means 71, which incorporate weighing means such as a strain gauge 72. The level measuring device also comprises a unit central 8 which is connected to the strain gauge 72, the central unit 8 being intended to determine the level of refrigerant in the tank 6. In fact, knowing the characteristics of the column 7, namely its empty weight and its dimensions, as well as the characteristics of the refrigerant L that it contains, namely its nature and its temperature, the knowledge of the total weight of the column 7 and the refrigerant L that it contains, makes it possible to instantly determine the weight of the latter and therefore its level in the column 7, and consequently the level reached in the tank 6.

Furthermore, in the application shown, the central unit is also connected to, without limitation, a clock 80, at least one external temperature sensor 81, a sensor 82 for the temperature of the refrigerant L in the tank 6, which could also be placed on the liquid line, and an alarm 83 which may be audible or visual, electrical contact or any other means of information.

The data recorded by the temperature sensor or sensors 81, 82 and the clock 80 make it possible to establish a database in which particular conditions of use are matched with a level of filling of the tank 6. At the same time, the CPU 8 raises the level of refrigerant L, the temperature and activity data, namely the day and time, and compares them to what is contained in the memory.

If the level of filling is lower than it should be, taking into account a deviation that has been predefined by the user, the central unit 8 will conclude to a leak and activate the alarm 83. Thus the installation is continuously monitored, and a leak can be detected without the need to wait for extreme conditions of use. This detection device allows other modes of use. Thus, the central unit 8 can establish statistics, and for example establish periodic averages of the level, which can for example be daily or weekly. If it is found that the daily average is steadily decreasing every day, and that this does not correspond to a constant variation of the activity and/or of the outside temperature, the central unit 8 may also conclude to a leak. The principle is identical with the establishment of a weekly average. Note that in all cases, and mainly in those previously stated, the central unit 8 will take into account the calendar in the establishment of its statistics, in particular to integrate holidays or non-working days, for which the activity may be different from other days, and thus weight the averages.

The local monitoring station 200 (see FIGS. 1B, 8A, 8B, and 9) is able to identify normal level variations in the refrigerant tank and determine a reference level, the solution alerts by email (see FIG. 3) as soon as a leak occurs and estimates the leak rate and the quantities lost. An optional energy module of the local equipment monitors the energy consumption of the installation's motors, the start-up frequency and operating time of the compressors and alerts in case of energy drift or risk of failure.

Figure 8A:
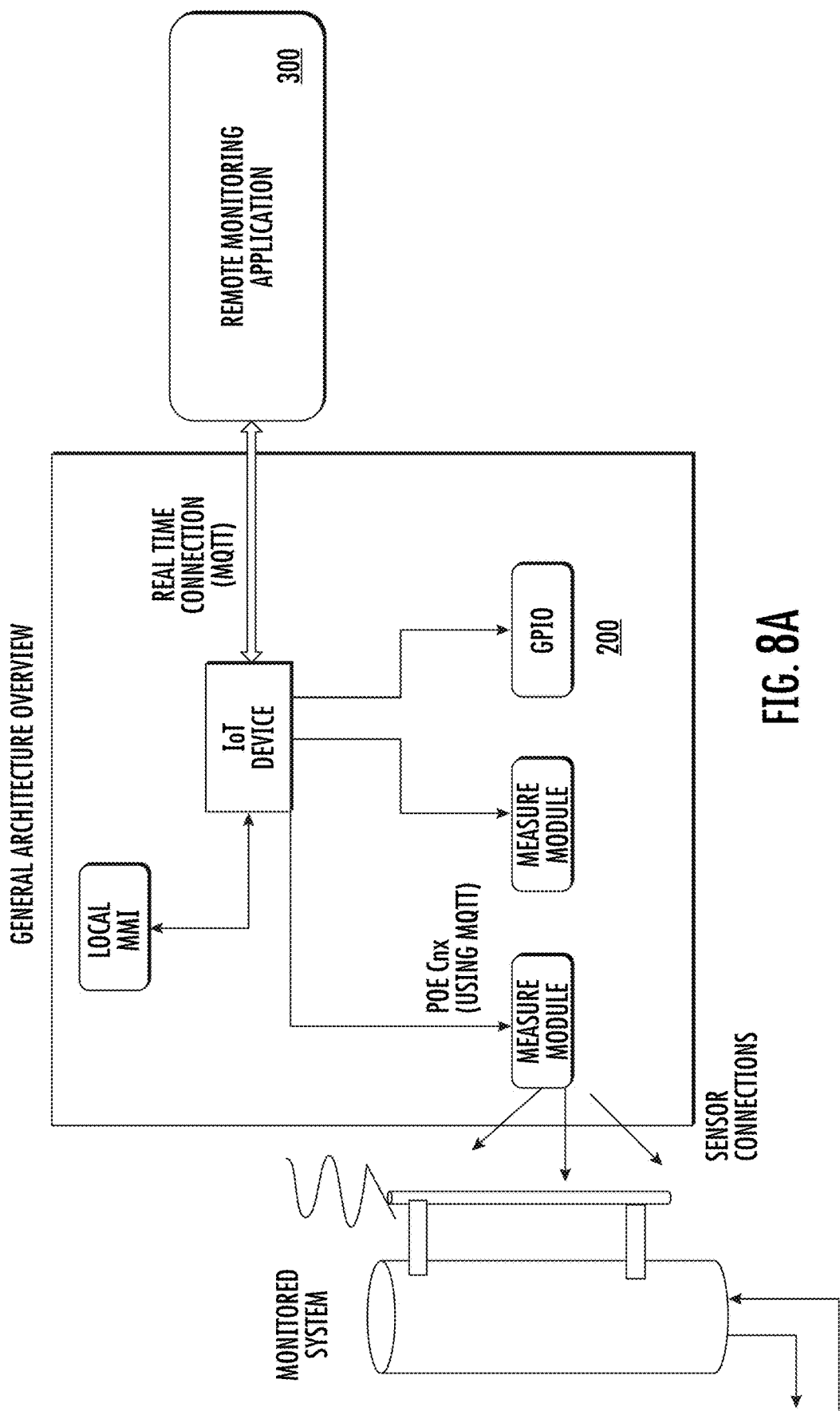
FIG. 8A is a schematic of an overall refrigeration/cooling monitoring system and method in accordance with an embodiment of the invention.
Figure 8B:
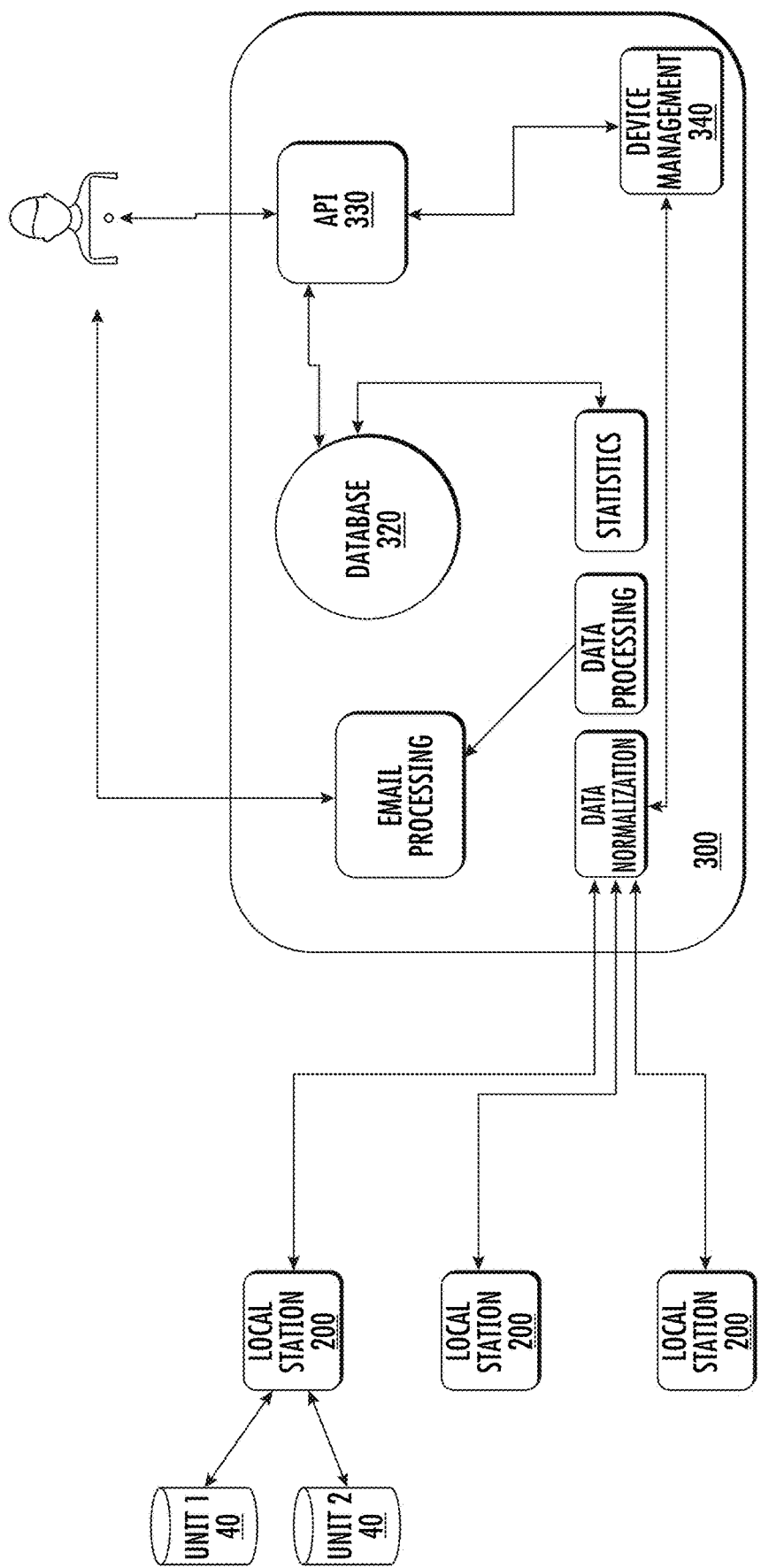
FIG. 8B is a schematic of a refrigeration and cooling monitoring system in accordance with an embodiment of the invention.
Figure 9:
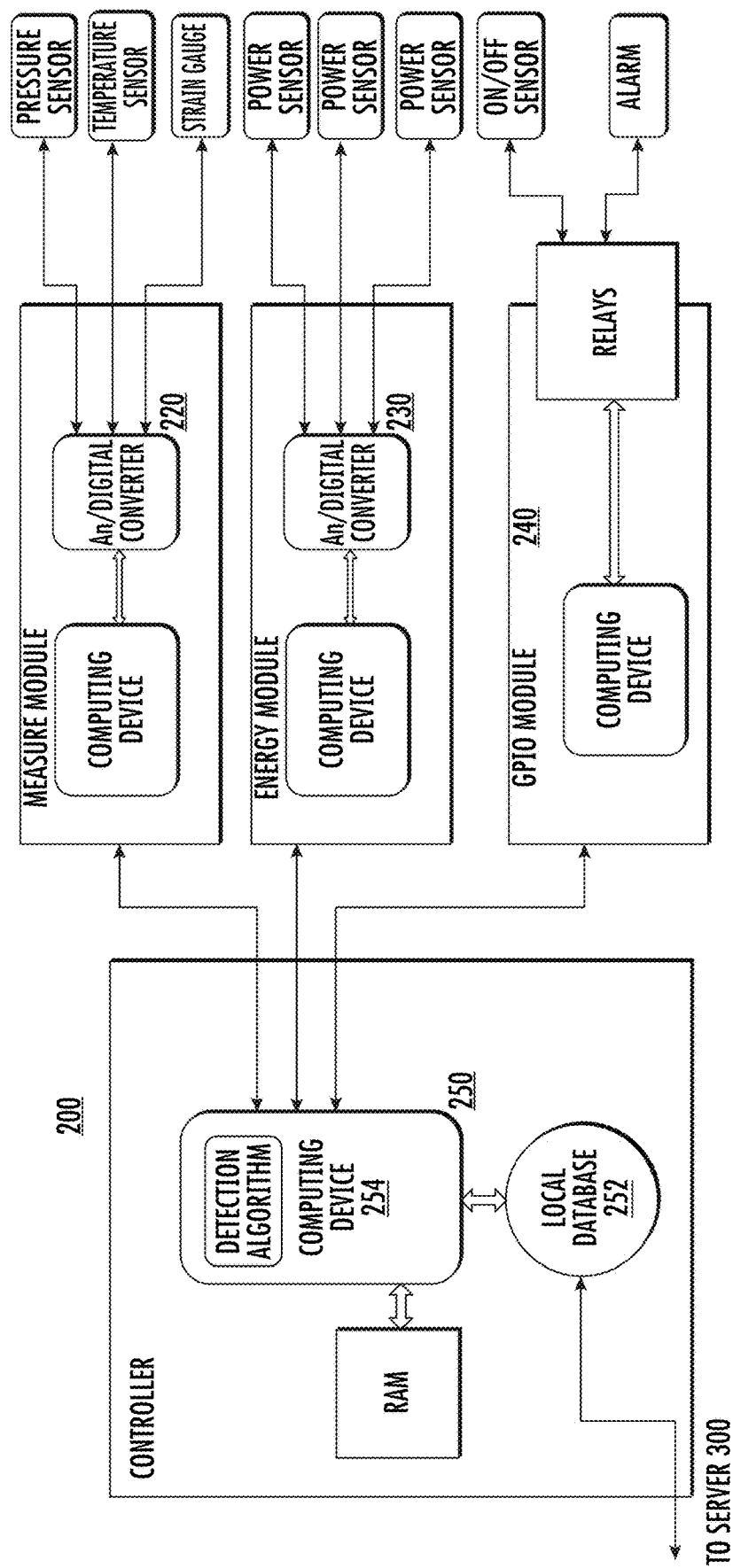
FIG. 9 is a schematic of a local monitoring station in accordance with an embodiment of the invention.

A schematic of an overall system diagram in accordance with the invention is shown in FIGS. 8A, 8B, and a schematic of the local monitoring station 200 is shown in FIG. 9. The refrigeration/cooling system being monitored is connected to a number of sensors which, in turn, are connected to one or more measurement modules. The IoT device is also connected to the measurement modules, e.g., via Power over Ethernet (POE) connections using, e.g., the MQTT protocol. The IoT device is also connected to a local interface (MMI) such as a screen, keyboard, touchscreen, or the like. A real time connection is provided (also preferably via the MQTT protocol) between the IoT device and the central computer(s) running the remote monitoring web application. Other means of connecting the various devices are contemplated as being within the scope of the invention. A General Purpose Input/Output (GPIO) device is also typically connected to the IoT device, e.g., a card used to communicate alarm states with the external world.

FIG. 8B is a schematic of a refrigeration and cooling monitoring system in accordance with an embodiment of the invention. A single local monitoring station 200 can monitor one or more refrigeration units 40 (see FIG. 9 detail). Every local monitoring station 200 sends raw data to server 300 periodically, e.g., every five seconds, via, e.g., the MQTT protocol. When received by server 300, the data is transformed, some business rules are applied, and data is stored in the database 320. If needed, an alarm is sent to users involved with supervision of this equipment through email, SMS, or other channels. Raw and transformed data are available through API 330 or through a web interface. Users can configure local monitoring station 200 remotely via server through the device management service 340 in manners to be discussed below.

FIG. 9 is a schematic of a local monitoring station in accordance with an embodiment of the invention. A set of sensors 210 are connected to station 200 to monitor and send data to measure module 220. Measure module 220 take a sample of the data periodically, e.g., every 5 seconds, and converts the data into numerical data through an analog to digital converter. Then the computing device running on the measure card in measure module 220 sends this data to controller 250 through MQTT protocol, for example. Some of the data comes from energy module 230, which monitors energy consumption and works on the same principle as measure module 220 (data sent periodically, e.g., every 5 seconds). Some of the data come from GPIO card/module 240 in the case of binary data (e.g., is the motor running or not), rather than quantitative data (e.g., temperature, weight, etc.). All of the data are sent to controller 250. Based on the description of the unit, an algorithm (described below) converts these raw data to processed data, the main data being the estimated weight of refrigerant in the device. The algorithm use this data to predict if there is a leak or not. Finally, these data are stored locally on local monitoring station 200 on local database 252 and sent to server 300. If a leak is detected by the detection algorithm (discussed below) on computing device 254, controller 250 sends to GPIO module 240 a command to trigger the start of a local alarm.

The web app, to be discussed in detail below, analyzes the data from the installations and presents them in the form of clear indicators. See e.g., FIGS. 2A-C. It provides a centralized monitoring dashboard showing the installations on a map with a color code according to their status. The dashboard also contains a list of alarms and advice on how to improve performance, as well as level curves with filters to simplify reading. See, e.g., FIGS. 4A and 4B.

Some features of the inventive system are as follows:
Installation:
  Easy cabling: RJ45 everywhere, POE power supply
  Single outdoor temperature sensor with wireless capability
  Better electrical safety: everything that comes out of the cabinet is low voltage
Connectivity:
  Independent, off-network client connection via 4G or the like
  Wi-Fi and Ethernet
Interconnectivity:
  Connection to customers' BMSs
Electronics:
  Modular
  Improved reliability
  Remote display
Calculations
  Additional data acquisition (heat recovery, condenser watering, temperature, pressure, etc.)
  Heat recovery and condenser watering included in the detection algorithm
Usage:
  Monitoring of several plants with the same solution
  Real-time remote parameterization
  Real-time information online
  User friendly graphic interface
  Ability to display the graphical interface on the client's tablet, wirelessly
Help and information:
  Onboarding
  Diary+complete with history A variety of exemplary screenshots of the system are shown in FIGS. 7A-E. These are screenshots of the web application user interface that allows the user to remotely configure the controller, which is located in situ at the location of the refrigeration system to be monitored.

FIG. 7A refers to the condenser evaporator. The aim here is to obtain as much information as possible about the monitored installation in order to analyze its behavior as well as possible. Knowing which type of compressor is being used is useful, because their start-up frequency and running time are monitored in order to warn of possible failures. The presence of a floating or non-floating high pressure allows for better monitoring because it allows for energy savings.

FIG. 7B refers to characteristics of the column. After entering information about the type of refrigerant used, the size of the liquid receiver to be monitored, and technical information about the condenser and evaporator, the user is prompted to enter the characteristics of the column used for level measurement. This column is connected to the receiver via hoses and weighed continuously. Thanks to the principle of communicating vessels, it is known whether there is a leak or not. It is essential to have accurate information, such as the distance between the column and the tank, in order to ensure good leak detection.

FIG. 7C refers to the association of a card. The aim here is to link the equipment to the monitored refrigeration plant, whether it is the measurement cards or the GPIO module, which allows the connection of on-board platforms to peripherals. The user can visually identify the equipment in order to associate them properly.

FIG. 7D refers to the association of probes. This is similar to what is depicted in FIG. 7C but for the probes. Here, the pressure probes are associated and it is indicated which measurements they take, at the tank inlet or outlet for example.

FIG. 7E refers to alarm setting. At the end of the "add a new unit" process, the refrigeration engineer determines the level of the low level alarm and can add a second threshold. S/he will also choose the sensitivity of the detection remotely.

Description of Local Monitoring Station 200 Screens

The local monitoring station 200 has an interface that can be viewed on computers, tablets, and smartphones from a browser (by connecting to the dedicated WiFi access point or local network) or on a dedicated device using a specific application. The local monitoring station 200 is installed by refrigeration technicians on behalf of refrigeration plant owners to monitor system operation. Each station 200 can monitor a plurality of refrigeration units.

Figure 10A:
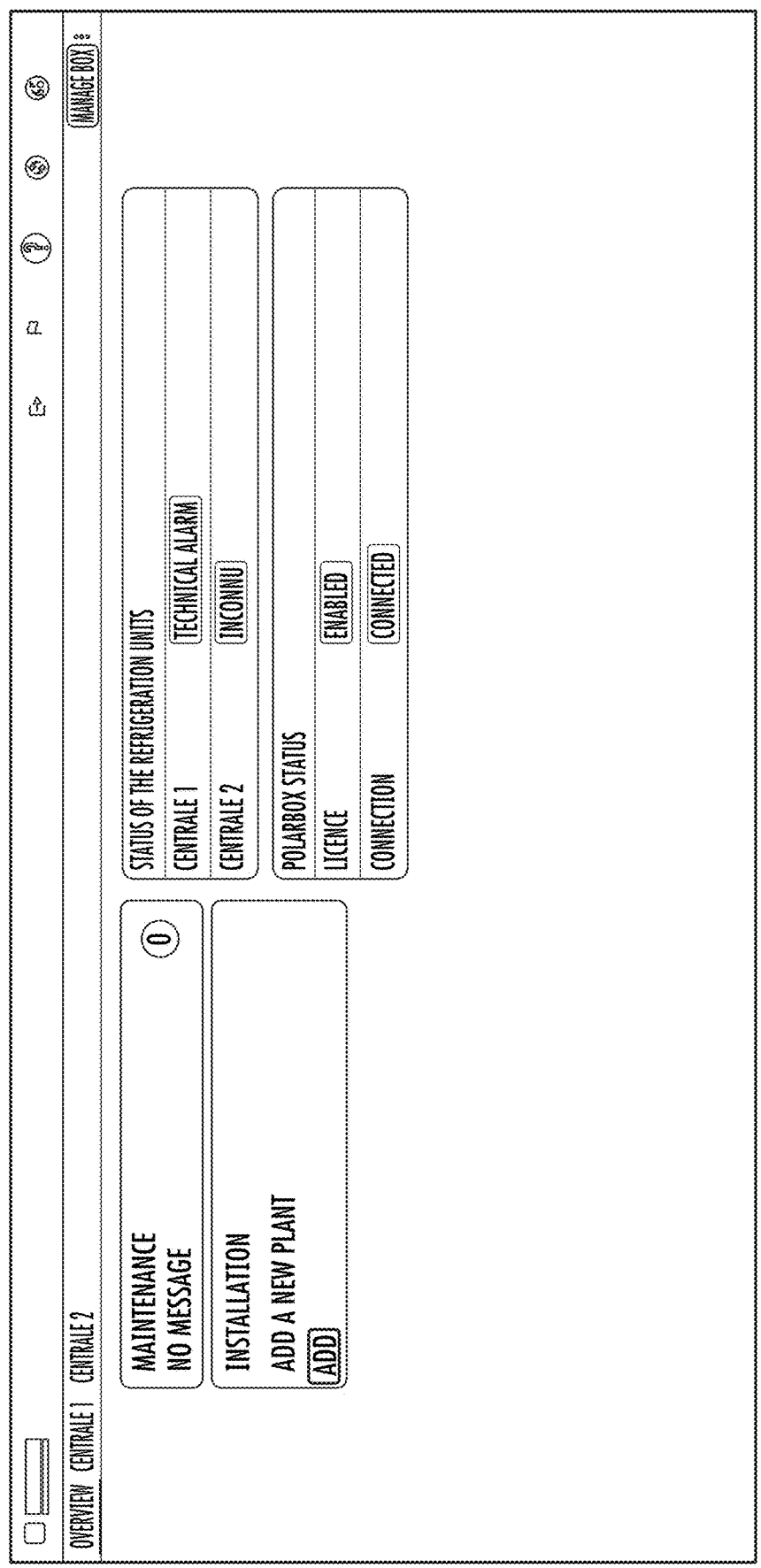
FIG. 10A is an exemplary screenshot of an overall dashboard of a local monitoring station in accordance with an embodiment of the invention.

FIG. 10A represents an exemplary screenshot of an overall dashboard. In FIG. 10A, the dashboard gives a summary view of the equipment in alarm (status of the control units) and advises on actions to be taken to ensure it is operating correctly (maintenance). The status of the local monitoring station 200 itself includes the License and Connection information.

A new control unit can be added to Supervision via the "Add" button in the "Installation" section.

Figure 10B:
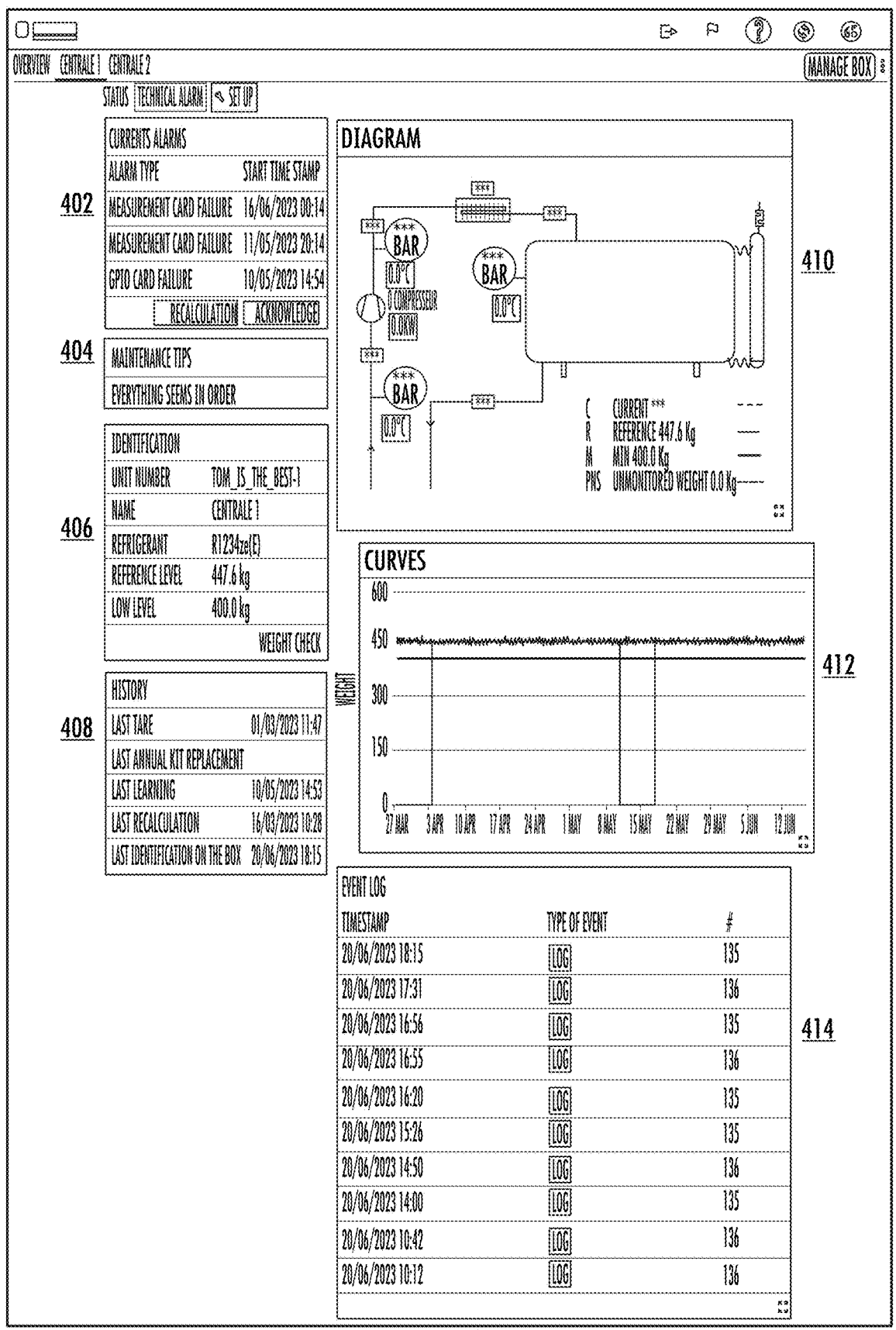
FIG. 10B is an exemplary screenshot of a number of aspects of a local monitoring station in accordance with an embodiment of the invention.

FIG. 10B represents an exemplary screenshot of a number of aspects of the inventive monitoring system. In FIG. 10B, various messages corresponding to the status of the monitored control unit are displayed:
  Normal
  Low level alarm
  Statistical alarm
  Technical alarm
Current Alarms In box 402, a list of active alarms is displayed with technical details and time and date stamps. The "Recalculate" button opens a module (an exemplary screenshot of which is shown in FIG. 10C) allowing the user to launch a training session (e.g., a 7-day analysis period during which the local monitoring station 200 determines the average fluid level) or a recalculation.

The "Acknowledge" button in box 402 opens a dialog box (an exemplary screenshot of which is shown in FIG. 10D)

for acknowledging alarms in progress. A checkbox indicates whether or not a leak has been located.

Box 404 lists advice on analyzing the data obtained from different measurements, such as replacing the annual kit required or configuring the low level threshold so that it is not adapted to the actual level.

Box 406 displays the plant number, its name, the refrigerant in the plant, the reference level, and the low level configuration. The Weight Control button opens a module displaying the measured gross weight, the column tare value, the height of the liquid in the column, and instructions on how to ensure that the column weight is measured correctly.

Box 408 displays the dates of the last tare, the last annual kit replacement, the last training session, the last recalculation and the last identification (user login) on the local monitoring station 200.

Figure 10E:
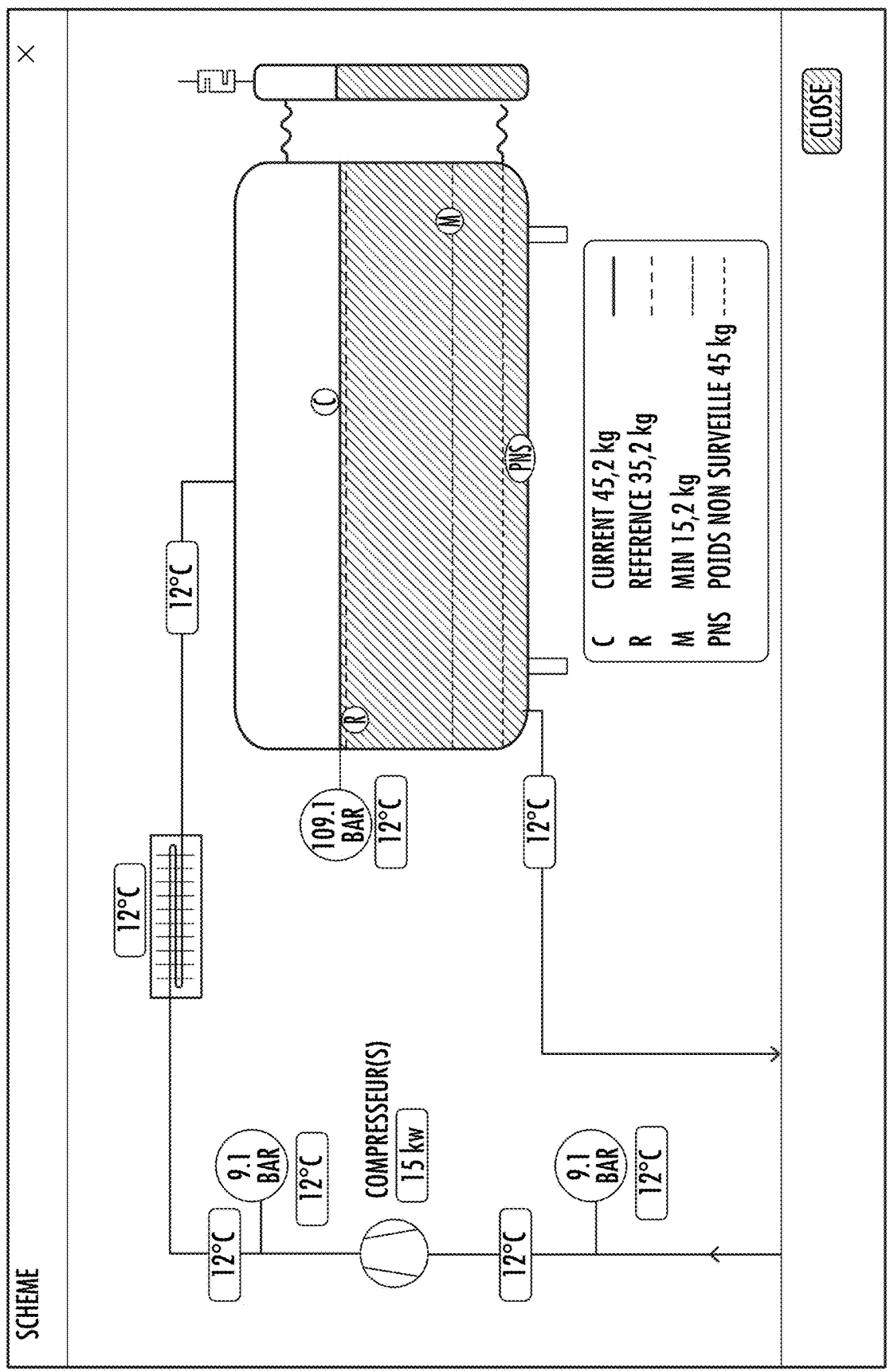
FIG. 10E is an exemplary screenshot of an installation diagram of a local monitoring station in accordance with an embodiment of the invention.

A diagram of the installation, shown in box 410 and in more detail in an exemplary screenshot in FIG. 10E adapts visually to the configuration of the control unit, shows the values measured and calculated by the local monitoring station 200 in real time. The tank can therefore be displayed vertically, horizontally, or at an angle, and the display adapts accordingly. The following values are displayed:

HP and LP pressure

Compressor suction and discharge temperatures, tank inlet and outlet, external

Current weight, reference level, low level alarm threshold and unmonitored weight (corresponding to the level below the spigot).

Click on the "enlarge" button at the bottom right to access the following additional information:

Density

Cooling capacity

COP (Coefficient of Performance)

Status of GPIO module inputs (Compressor running/Heat recovery/Condenser watering)

Figure 10F:
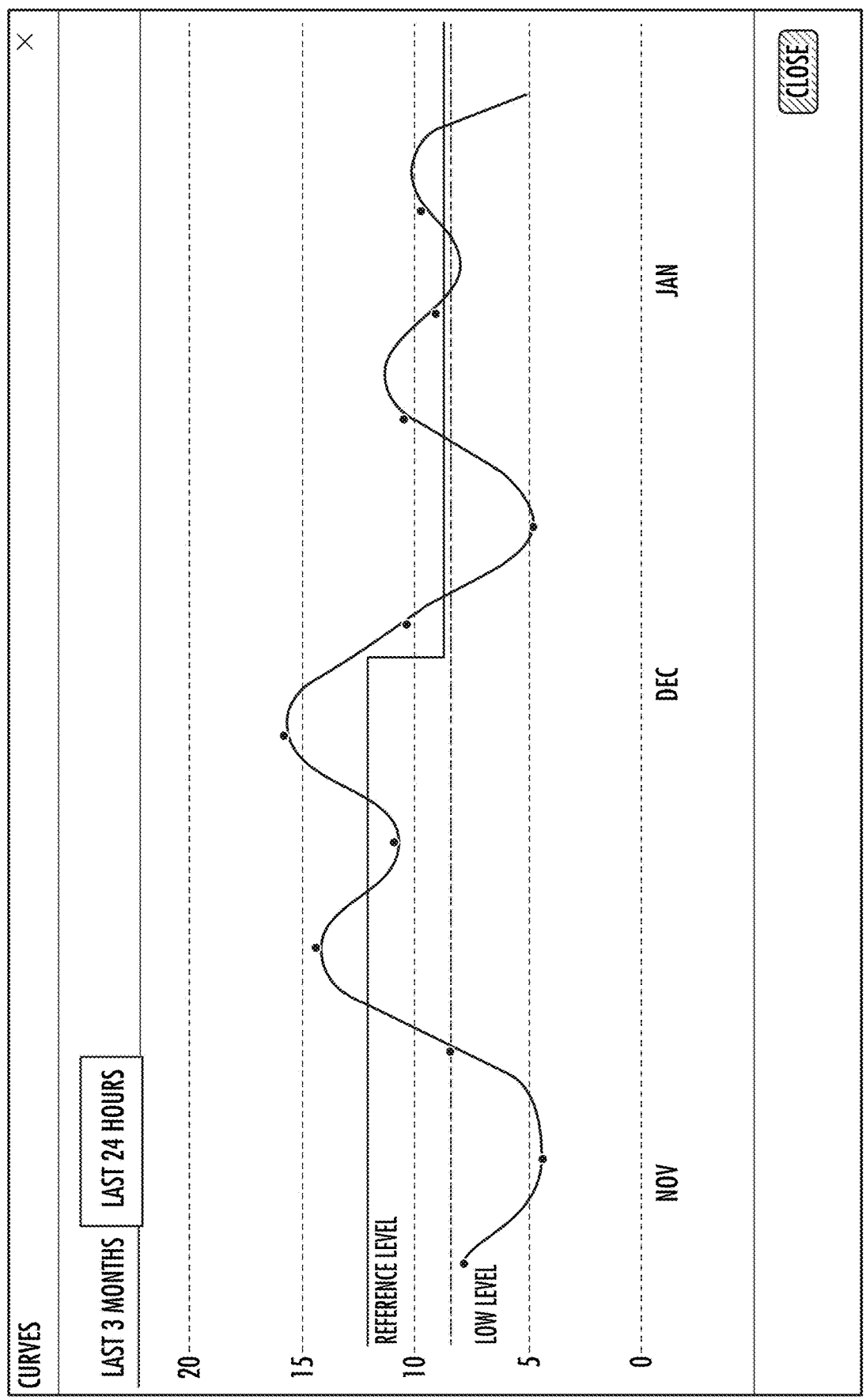
FIG. 10F is an exemplary screenshot of a refrigerant level status of a local monitoring station in accordance with an embodiment of the invention.

Box 412, shown in more detail in the exemplary screenshot of FIG. 10F, displays the level of refrigerant in the liquid receiver (HP). It is shown here in solid, with its variations. The dashed curve, smoothed over this fluid level, represents the reference level. It is established after a period of learning how the installation works, this period allows the normal variations in the refrigerant level to be understood and thus establishes the reference level. The dotted line is the low level alarm threshold, determined by the refrigeration operator.

By clicking on the "enlarge" button at the bottom right, the user can access 2 tabs: "Trend" (over a predefined period, showing the trend in variations in the measurements) and "Daily" (detailed, giving a precise record of the measurements obtained).

It is also possible to select a particular period for the trend curve or a specific day for the daily curve.

All the actions carried out manually or automatically, locally or remotely, on the equipment, are listed in box 414, the event log, with the timestamp and type of event, shown in more detail in the exemplary screenshot of FIG. 10G.

Clicking on the 'enlarge' button at the bottom right adds the option of filtering by event type (selec list). Clicking on the 'Information' arrow opens a module displaying detailed information.

What follows is a step-by-step instruction as to a configuration mode of a typical embodiment in accordance with an embodiment of the invention.

Accessible by clicking on a 'Configuration' button on the Central 1 to 4 tabs, a module containing, for example, 7 tabs is displayed. Authentication is required to access it, via a personal code generated on the web app.

Parameters

This tab allows you to configure the plant according to different categories (expand-collapse)

Identity: Name of the control unit and date of installation.

Refrigerant: Nominal charge, Tonne eq CO2 and type of refrigerant

Tank: Type of tank (horizontal, vertical, inclined), tank volume (dm3), number of tanks, length/height of tank (mm), incline (mm), internal diameter of tank (mm) and sub-cooler at tank outlet (toggle button).

Condenser—evaporator: Condenser volume (dm3), type of compressor and condenser, HP or LP setpoint temperature, and floating HP, adaptive LP, heat recovery/condenser watering (toggle button).

Column: column pipe (1" ⅝ copper, 1" ⅝ K65 copper or 40*2 stainless steel), distance between tank tappings (mm), distance between tank bottom and bottom tapping (mm).

Card Association

This tab is used to associate measurement, GPIO and energy modules with the controller. 3 expand-collapse for each type of module, after clicking on the refresh button (which updates the list of available modules connected to the switch).

The modules are therefore listed with the following information:

Card availability (indicating whether it is associated with another control unit or not).

Serial number (for visual identification)

An "Association" toggle-button is used to attach a module to the control unit during configuration. The "Identify" button causes the LEDs of the module concerned to flash, making it easier to locate in the machine room or electrical cabinet.

Engines

This tab is used to configure the Energy modules according to the number of motors to be monitored.

The fields below are required:

Engine name

Motor type (compressor, condenser fan, pump, etc.)

Presence of a drive

Distribution across the plant (in %)

Brand/Reference (not compulsory)

Mode (Three-phase, Single-phase, Balanced three-phase)

Associated current transformers (CTs)

Probes

The temperature sensors, identified by their serial number, are associated and located by means of a select list. Manual calibration can be performed to correct sensor readings if necessary.

The range of pressure transmitters can be modified.

GPIO

Each GPIO input and output is configured via the corresponding select-list.

The LEDs indicate the status of the input in real time (if the input is inactive, the LED is grey, if it is active (e.g. compressor running) it is green).

Tare

This tab allows you to define the column tare by clicking on the "Do the tare" button.

An error is displayed if the tare value is too low.

An information message gives the theoretical tare of the column and information on the tare procedure.

Alarms

The low-level alarm thresholds and the sensitivity of the statistical alarm are set via this tab. It is possible to activate a second low level alarm threshold (via toggle button) which is only used when the compressors are stopped. This is used to manage pumpdown or fluid migration in the condenser. The sensitivity of the alarm is set via a slider over a defined range. This sensitivity has an impact on the speed at which an alarm is triggered in the event of a leak detected by the algorithm.

The "alarm relay test" button simulates the output relays for a few seconds to check that the alarm chain is operating correctly.

Managing the Local Monitoring Station

This module allows you to configure the following elements:
  Network connection
  Regional Settings Network Connection The type of connection can be Network module, Ethernet JR45, Wifi.

For RJ45 and WiFi, the DHCP, Gateway, Subnet mask, IP address and access point parameters can be modified.

Regional Settings

This menu allows you to set the country of use, the time zone and the date and time formats. The choice of measurement system, metric or imperial, allows you to select the units in which the data will be displayed.

Another such set of exemplary configuration screens in accordance with an embodiment of the invention is shown in FIGS. 7A-E.

Continuous Synchronization/Continuous Synchronization with the Cloud

The icons located at the top right of the header in FIG. 10A display the synchronization status:
  HMI with the controller (to ensure that data is updated)
  The controller with the servers (to ensure data exchange)
An icon is, e.g., green when synchronization is functional and turns, e.g., red when it is dysfunctional.

FIGS. 6A-F depict exemplary screenshots of a web application in accordance with an embodiment of the invention. The web app can be displayed on computers, tablets, and smartphones, from a browser or within a dedicated app. The web app is used by refrigeration technicians and refrigeration installation owners to monitor the operation of refrigeration units. The web app provides a global dashboard with a map and a list of equipment in alert (leak, energy drift, technical issue . . . ), refrigerant levels, and energy consumption curves, and users and locations management and remote settings.

Figure 6A:
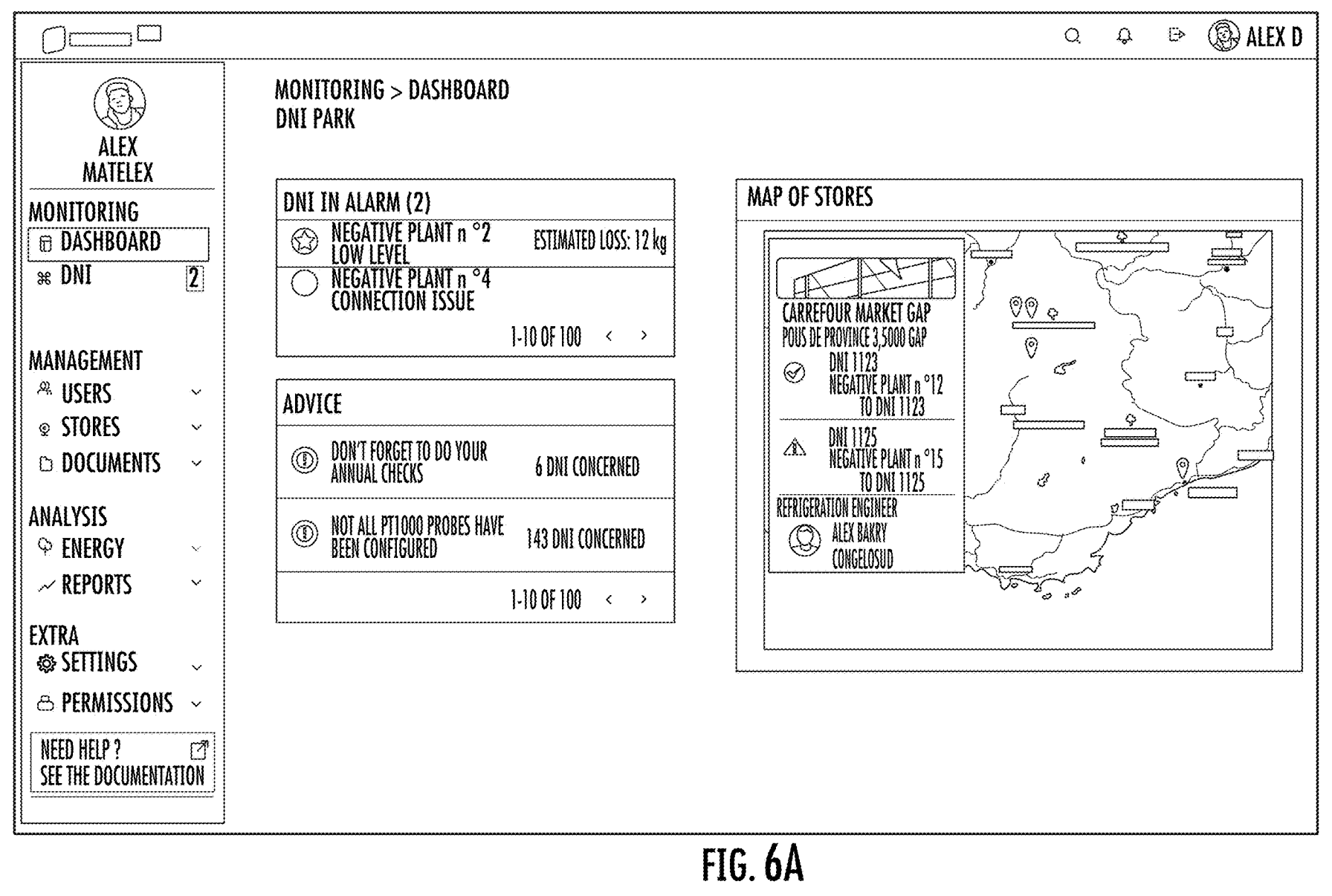

FIG. 6A represents an exemplary screenshot of a global dashboard of the web app. The dashboard provides an overview of equipment alarms and recommends actions to ensure their proper operation. On the right-hand side, a map with visual indicators shows the sites where the equipment is installed. Different symbols and/or colors will indicate different things, for example:
  Green: no leak
  Blue: learning period for system operation
  Orange: loss of connection
  Red: leak (low-level or statistical alarm)

Clicking on a site (colored marker) displays the equipment identity card with:
  Site location
  Site name
  Equipment name and number
  Link to equipment details
  Name of technician in charge of this equipment The left-hand side lists the equipment in alarm in the park. Each user has access only to the equipment they own or manage. The type of alarm is displayed, and a click takes the user to an equipment master page with a description and information on the equipment concerned.

Figure 6B:
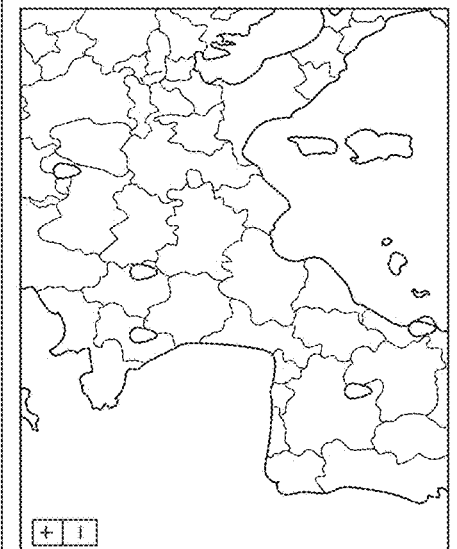
FIG. 6B is an exemplary screenshot of an equipment master page of a web application in accordance with an embodiment of the invention.

From the left-hand menu of the screen in FIG. 6A, one clicks on "equipment" to go to the equipment master page, an exemplary screenshot of which is shown in FIG. 6B. This master page is dedicated to searches. It's possible to search for equipment from a map, using filters (location, site where equipment is installed, group, brand) or using the free search function. The results are displayed as a list with the site name in the title, and a click displays a drop-down list of the different equipment available on site.

On the results list, several categories are available as tabs:
  All equipment
  Alarm equipment
  Equipment to be checked in the near future (annual maintenance)
  Equipment not attached to a technician in charge of maintenance The web app displays, for example, from 5 to 100 items per page and a button allows to delete all filters. Navigation on the map is dynamic, allowing the list to be updated. From this page, an "add" button is available to create a new equipment listing, which takes the user to, for example, FIG. 6C.

Figure 6C:
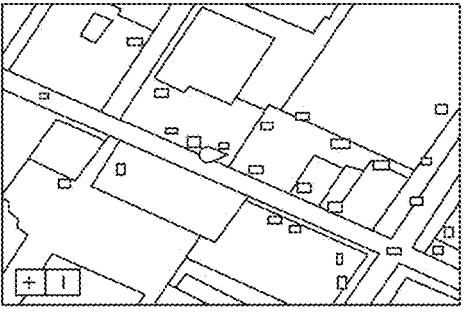
FIG. 6C is an exemplary screenshot of a web application in accordance with an embodiment of the invention.

The exemplary equipment screenshot of FIG. 6C can preferably be accessed from several pages:
  Click on "equipment" in alarm from the dashboard list or map;
  From equipment search or equipment list (master page equipment).

This page takes users to:
  Equipment identification information: equipment number, refrigeration plant reference and name, refrigerant contained in the plant, reference fluid level, low level alarm threshold.
  Equipment history: installation date, date of last tare of the column dedicated to level measurement, last algorithmic learning of refrigeration unit operation and date of last recordings.
  Equipment version: equipment type, software version, kernel version, hardware version, etc.
  Map showing geographical location of equipment
  Information on the installer in charge of the installation: name of branch, location, telephone number, e-mail address, name of manager.

Figure 6D:
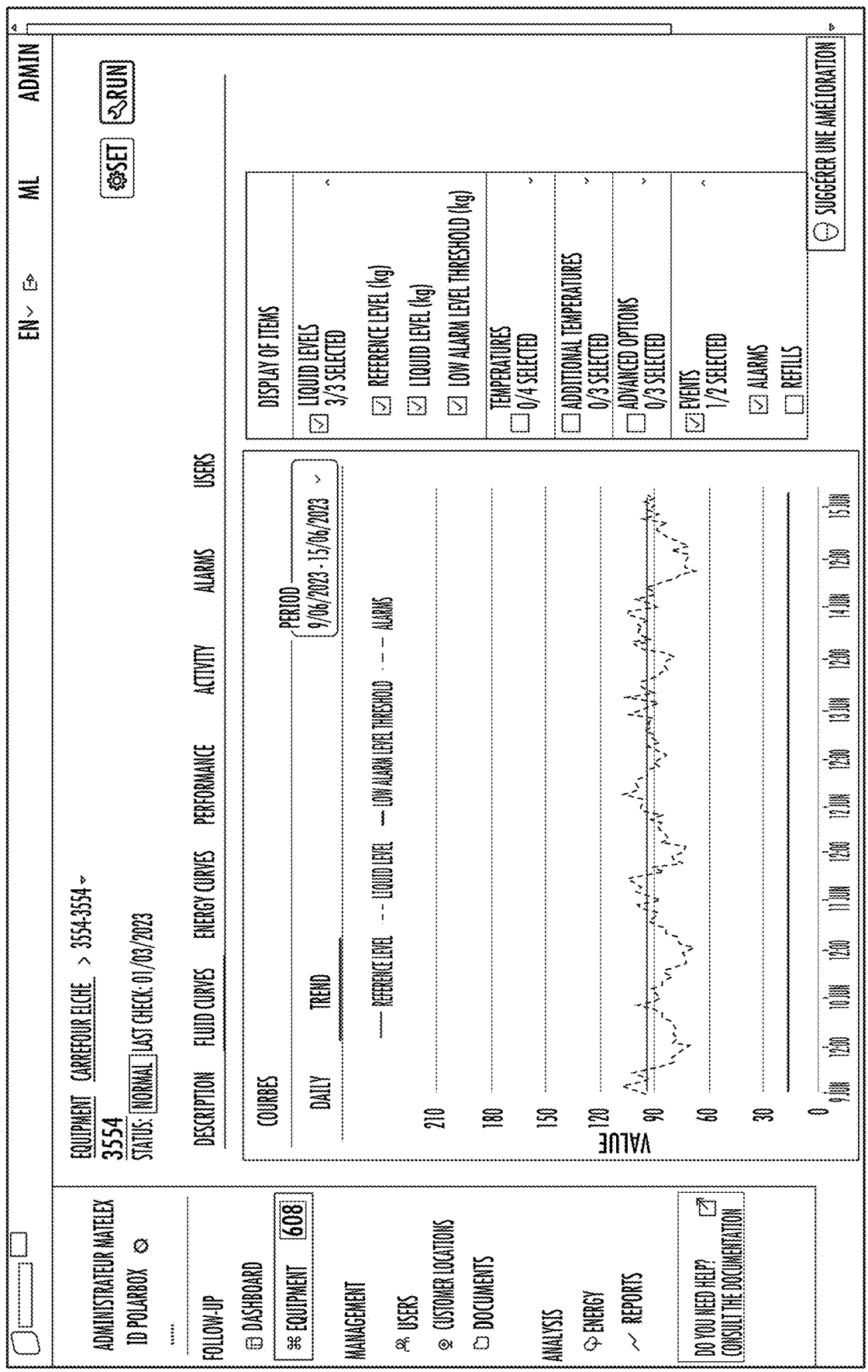
FIG. 6D is an exemplary screenshot of a fluid curve page of a web application dashboard in accordance with an embodiment of the invention.

An exemplary screenshot of a fluid curve page is shown in FIG. 6D. It displays the refrigerant level in the liquid receiver (HP). It is shown here with its typical variations. The straight line smoothed over this fluid level represents the reference level. It is established after a period of learning how to operate the system. This period enables the system to understand the normal variations in refrigerant level, and thus establishes the reference level. The dotted line at the bottom of the graph is the low-level alarm threshold, set by the refrigeration operator.

Trend curves (smoothed) and daily curves (more detailed) are displayed here. Curves can be zoomed in for detailed fluid level analysis.

It is also possible to select a specific period for the trend curve or a specific day for the daily curve.

When the refrigerant level falls below one of these two thresholds, an alarm is sent by email, and displayed on the control panel and equipment.

On the right-hand side of the screen are filters that allow the user to add or remove data for a better reading of the map:

Liquid levels
Temperatures:
  Tank inlet
  Tank outlet
  HP temperature
  Outside temperature
Additional temperatures:
  Overheating temperature
  Measured discharge temperature
  LP temperature
Advanced options:
  Passages below level within the hour
  Gas flash
  Low temperature (nb/hours)
Events: displays events on curves:
  Alarms
  Refills
A button allows to delete filters.

Figure 6E:
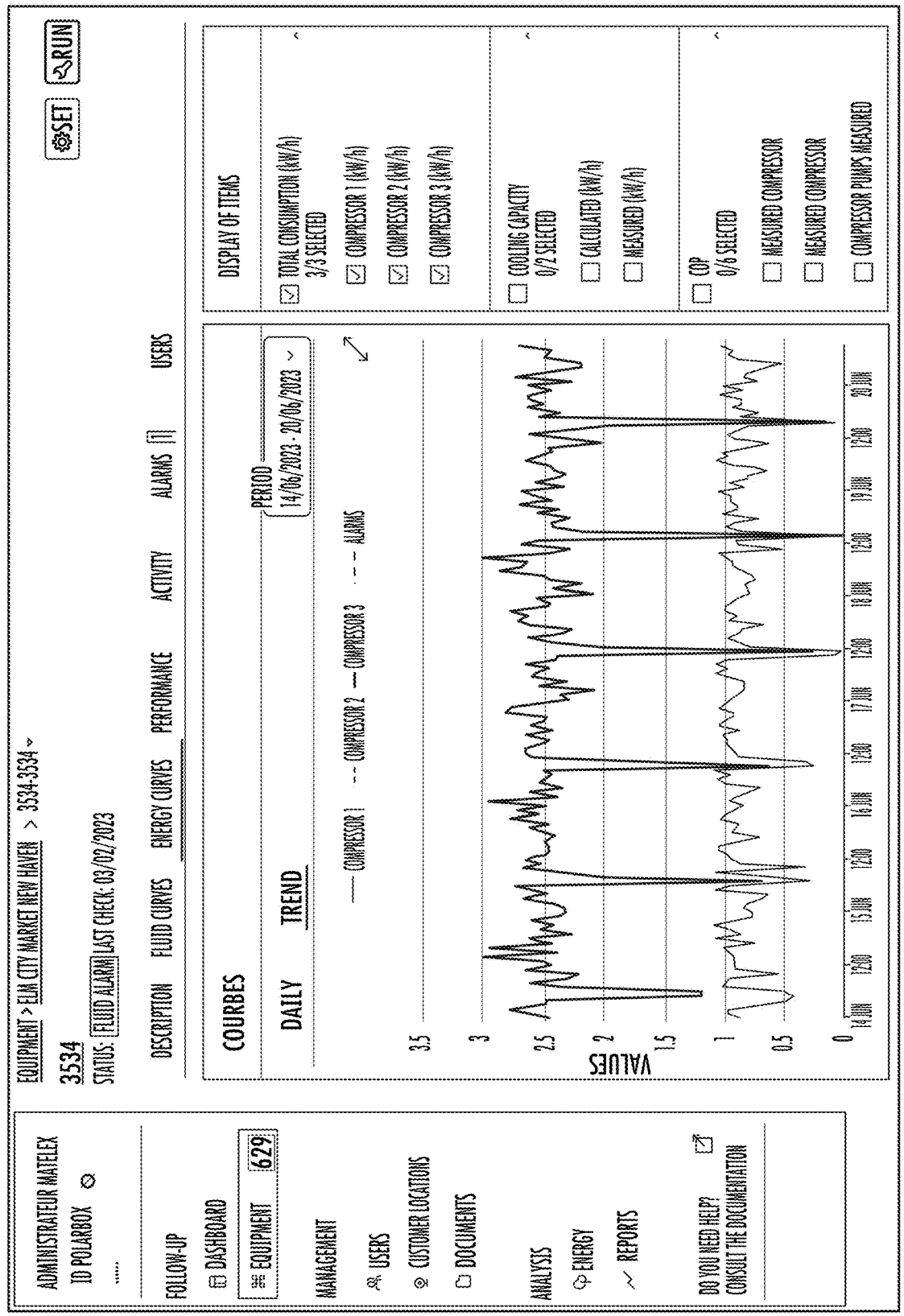
FIG. 6E is an exemplary screenshot of an energy monitoring page of a web application dashboard in accordance with an embodiment of the invention.

An exemplary screenshot of an energy monitoring page is shown in FIG. 6E. Based on the same principle as the refrigerant level curves, here users find the energy monitoring curves. They are available as trend curves and daily curves, for a more detailed analysis. Plant motor consumption is available in kWh for:
  Compressors
  Condensers
  The pumps
Additional information can be added thanks to filters, such as: cooling capacity, actual plant Coefficient of Performance or COP (measured, not estimated), and events such as alarms and recharges.

Figure 6F:
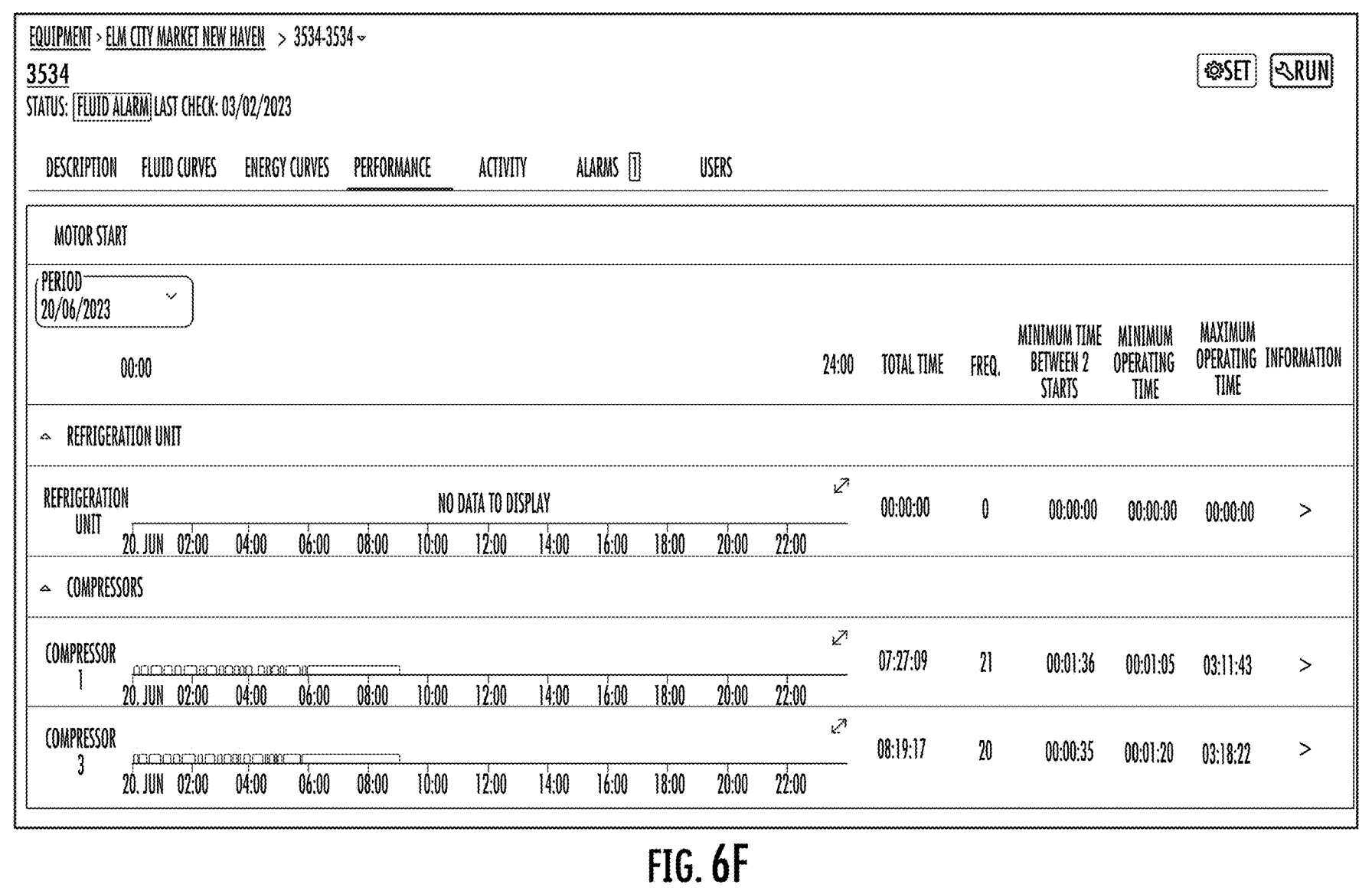

An exemplary screenshot of an equipment performance page is shown in FIG. 6F. The performance tab monitors the refrigeration plant's start-up frequency and running time. The same applies to compressors to monitor their start-up and operating frequencies to identify short cycles that can damage compressors.

Other screens and pages not depicted are also available on the inventive web app. For example, an activity screen serves as the equipment logbook. It contains a list of events with date and time, for example:
  Leak alarm
  Energy drift (available with energy module)
  Acknowledging an alarm
  Launching a relearning process
  Restart
The event type can be filtered and the date selected.

An alarm screen displays all current alarms for a device, as well as the alarm history. For alarms in progress: alarm type, description and day and time of triggering are displayed. The arrow on the right allows the user to view detailed alarm information within the same modal:
  Details of the plant concerned
  Alarm details (sensitivity)
  Level contours
  Advice, etc.
This display also appears when an alarm is received by email. A click takes users to this modal.

Another screen displays a list of users attached to the equipment, with their name, company and role, as well as whether or not they receive alarms. Someone who does not receive alarms by e-mail will still be able to access the data from the platform. Information can be modified from management—users.

Two buttons are seen available at the top right of the exemplary screens of 6C-F: the "set" button and the "launch" button.
SET: to access remote settings.
  Alarm settings: allows the user to set the low-level alarm threshold, a second threshold and a time delay for triggering the alarm.
  Statistical alarm sensitivity setting (reference level)
  Configuration: modify information about the refrigerant in the system, reservoir type and volume, high and low pressure setpoints and information about the condenser, evaporator and compressor (type, volume, capacity). All this information is important for the leak detection.
  Measurement card: here users define the range and offset of the high and low pressure gas pressure transmitters. A correction is applied to the various temperature probes. A column category then provides access to information on the liquid column dedicated to level measurement (material, tare and distance between high and low tapping). A system section displays information on the measurement board, including version and address.
  Energy module: links current transformers to motors whose power is measured, indicating power in amperes, the number of CTs and the corresponding load.
  Network: the network section contains information such as the type of connection (wifi, ethernet, 4G) and the MAC address of the equipment, followed by DHSCP information and information on any VPN server. Different users (e.g., engineer, administrator, owner, IT, etc.) will have different levels of access to this (and other) sections; some sections may be greyed out to indicate a lack of access by that particular user or class of user.
RUN button: used to re-learn plant operation, acknowledge an alarm, recalculate the reference level following a leak or fluid top-up, for example, request a data update and restart the equipment.

Other pages and screens allow users view and manage their access and other peoples accesses. A search bar and filters enable to quickly find the user or group of users, as well as to temporarily or permanently deactivate a user.

A customer site management page lets users manage the locations where system equipment is installed. Active and inactive sites are shown. Sites can be searched using a search bar, and sorted by clicking on the column headings. An "edit" feature lets users edit site/store information, such as:
  The name of the customer location
  The store chain/brand to which it belongs
  The name of the installer in charge of this location
  The site manager's contact details and e-mail address
  The start and end date of the subscription to the web platform
  On the right-hand side the user will find information about the location of the site.
From an "equipment" tab, users can link a site to a store, and from a "users" tab, they can link users to the sites they own or manage. When a store is selected, a "suspend subscription" button becomes active. It allows to temporarily suspend a subscription.

A documents area is a user-specific document space, but also enables documents linked to the equipment and therefore the installation to be shared, such as a logbook, plans, or regulatory annual inspection certificates. A sharing function for other users is preferably available for this document library.

Expert reports on refrigeration systems are preferably available at least at two levels:
  Installation level only
  Plant fleet level, for a centralized view of performance indicators for all plants owned or under management These reports may contain the following information:
- Leakage rate
- Defects noted (annual kit replacement date, insufficient fluid charge,
- Average COP
- % of tank filling,
- HP drift, average leak rate for all the installations monitored The invention contemplates a number of different leak detection algorithms to be run either on local monitoring station 200, server 300, or partially on each, or both.

Figure 11:
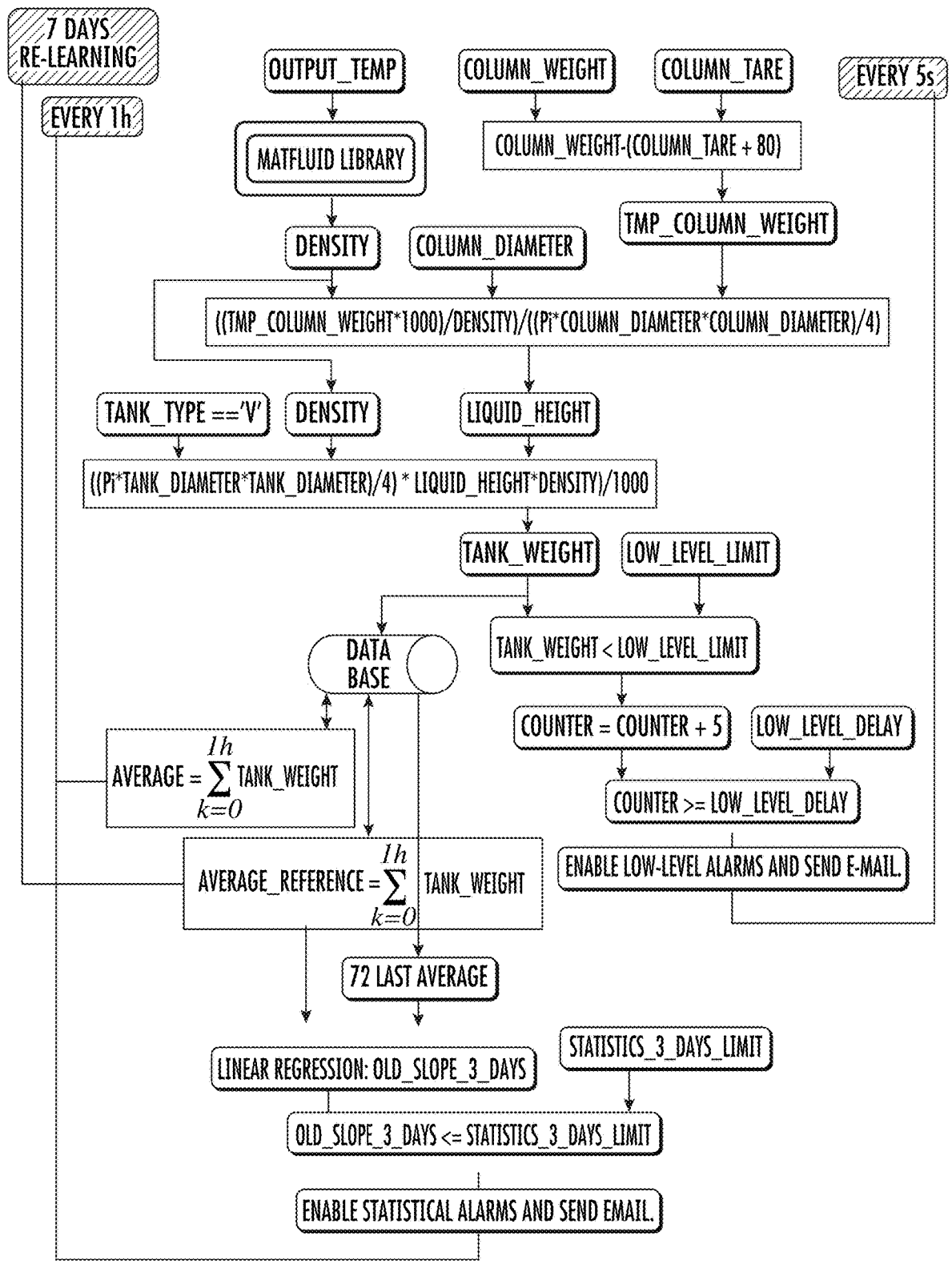
FIG. 11 is a schematic of an exemplary algorithm employed in accordance with an embodiment of the invention.

One such algorithm is depicted graphically in FIG. 11. Its main goal is, initially, to register a suspicion of leakage on the refrigeration/cooling installations with a triggering of the alarm relay in the concerned facility and an email to the owner of the shop via remote server 300. Additionally, it detects the low level of refrigerant in the tank to avoid running out of refrigerant by triggering alarms and sending email.

For this algorithm to run optimally, there are main input data that are important to have, as well as secondary input data that are used for other functions. With reference to FIG. 11: Main input data
The main data used for the proper functioning of the algorithm are:
A temperature at the tank outlet in ° C. 'output_temp'.
The measured weight of the column in gramme 'column_weight'.
The statistical limit for triggering the statistical alarm, which enables the relay to be activated and an email to be sent if the calculated level is below to the defined threshold 'statistics_3_days_limit'.
The low-level limit in grams that gives the low-level alarm by activating the relay and sending email when the defined threshold is less than the calculated weight 'low_level_limit'.
The low-level delay, duration when the weight is less than the threshold, the alarms are activated, and the email is sent to the customer to warn him 'low_level_delay'.
Diameter of the column defined by the refrigeration engineer 'column_diameter'.
Diameter of the tank defined by the refrigeration engineer 'tank_diameter'.
Tank type which can be vertical or horizontal (with or without tilt) 'tank_type'.
Tank tilt is the angle of inclination of a vertical tank 'tank_tilt'.
Secondary Input Data
An inlet temperature of the tank in ° C. 'input_temp'.
An external temperature in ° C. 'external_temp'.
A discharge temperature and a suction temperature for energy calculations in ° C. 'discharge_temp', 'suction_temp'.
The low and high pressure for energy calculations and other functionalities in bar 'lp', 'hp'.
Matfluid, library that allows to calculate the density, the enthalpy etc. from the temperature or pressure.

With continued reference to FIG. 11, initially upon installing a local monitoring station 200, refrigeration engineers must make some operations as to install all needed sensors and do the tare of the column (column_tare) by measuring the weight of the column when it is empty.

When they finish those operations, they must preferably make a 'relearning' that involves collecting measures for a time period, e.g., seven days, that the local monitoring station 200 uses to calculate the average reference of the weight (average_reference) during this period.

Approximately every five seconds, measure module 220 sends an input data with the weight of the column and the output temperature to local monitoring station 200 which uses an internal library (Matfluid) to determinate the density from the output temp. Controller 250 calculates the liquid height using the column height, the column tare, the column diameter, and the density. Additionally, the local monitoring station determines the weight of tank (tank_weight) depending on the tank type, the calculated liquid height, the density, and the tank diameter. It compares the calculated tank weight with the given low-level limit. If the tank weight is less than the low-level limit, the counter is increased. If the low-level delay is less than the counter and the calculated weight of the tank is yet less than the low-level limit, local monitoring station 200 triggers a low-level alarm, activates the relays, and sends an email. Local monitoring station 200 also saves every calculated weight and other parameters into the database.

Every hour, local monitoring station 200 retrieves the data recorded during the current hour to calculate the average of all the parameters and then checks whether the slope calculated, thanks to the linear function and parameters such as the tank weight (tank_weight) and the average reference which is calculated during the relearning period (average_reference), is not below the statistical threshold entered by the customer. If the slope (old_slope_3_days) is below the threshold, local monitoring station 200 triggers a statistical alarm, activates the relays, and sends an email. local monitoring station 200 also records the average data into the database.

In FIG. 11, the example is given for a vertical tank. For a horizontal tank, the calculation process does not change, only the formula for calculating the weight of the liquid will change.

Another version of an algorithm in accordance with an embodiment of the invention is as follows.
The first step in the algorithm is to aggregate the values of the water level over several window sizes, ranging from one week to six months. The six-month window size will identify leaks with a low amplitude, while the one-month window size will identify leaks with a higher amplitude. Preferably one hundred values are retained per aggregation window, for each of which several criteria are estimated:
1. the difference in level between the start and the end of the period is greater than a fixed threshold;
2. the difference in level between the start and the end of the period, and the relative maximum volume of the tank, is greater than a fixed threshold;
3. the value of decline relative to range of levels is greater than a fixed threshold, in which:
    Given (xt) $1 \leq t \leq 100$ the set of liquid levels of a given window:
    Transformation of the temporal series using a moving means,
    Estimation of the gradient using a final difference of order 4,
    Estimation of the decay part relative to all variations using the following formulae:

$$\frac{\sum_{t=1}^{100}|grad_t|\mathbb{1}_{grad_t<0} - \sum_{t=1}^{100}|grad_t|\mathbb{1}_{grad_t>0}}{\sum_{t=1}^{100}|grad_t|} \quad (1)$$

4. The drop in liquid level is not due to a point discontinuity, as determined thusly:
Let $(xt)1 \leq t \leq 100$ be the set of liquid level values in a given window:
Time series transformation using a moving median,
Gradient estimation using a finite difference of order 2,
Detection of discontinuity points—if the value of the following formula is below a fixed threshold $$\frac{grad_t}{\text{median}(|grad_t|_{1 \leq t \leq 100})} \quad (2)$$

Estimation of criterion 3. without discontinuity points, if the criterion is not activated then the drop is explained by a point discontinuity.
If all of the above criteria 1-4 are met, an alarm is generated.

Figure 5:
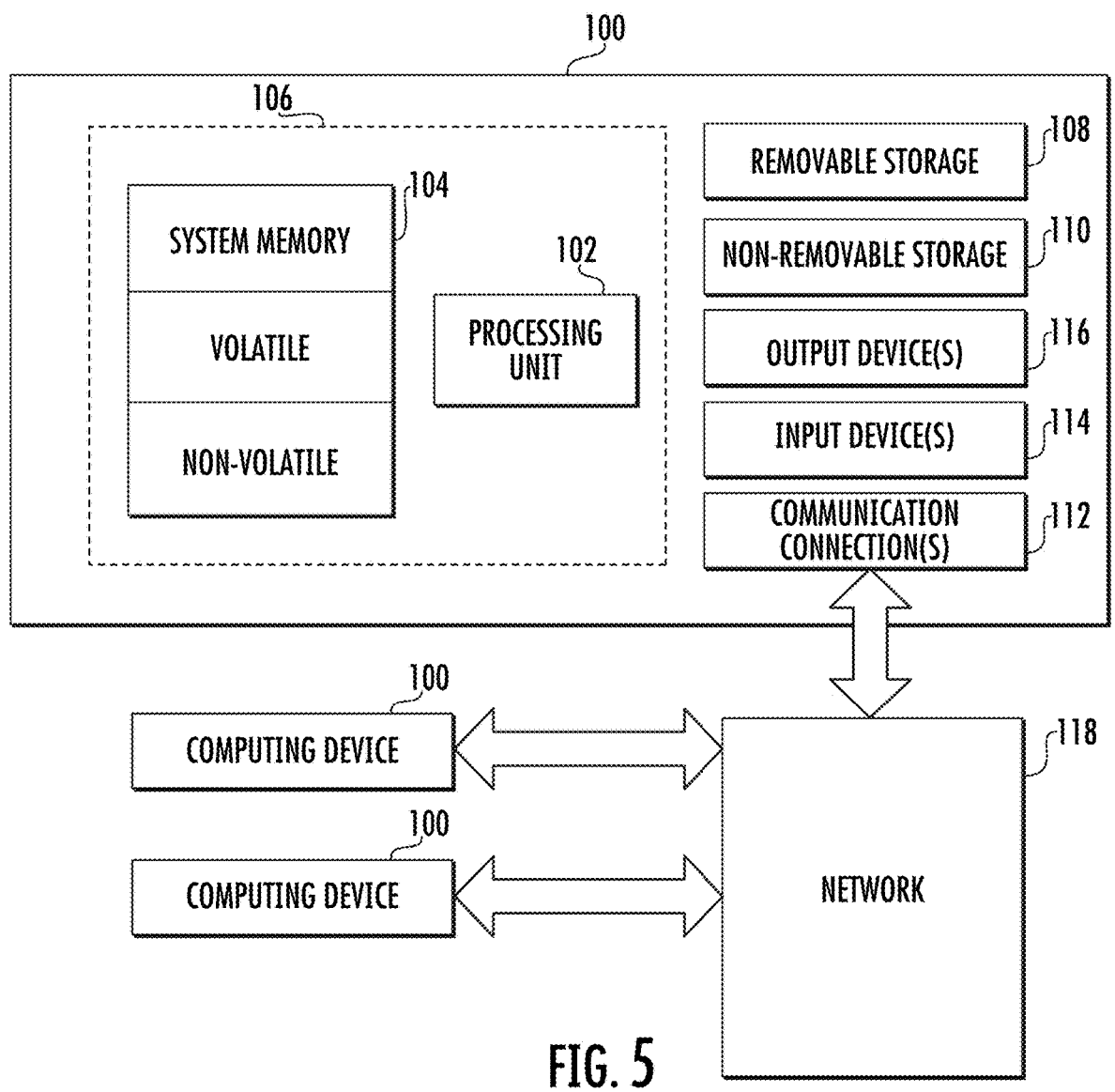
FIG. 5 is a block diagram of an exemplary computing environment within which various embodiments of the invention may be implemented and upon which various embodiments of the invention may be employed.

FIG. 5 depicts an exemplary computing environment in which various embodiments of the invention may be implemented and upon which various embodiments of the invention may be employed. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 5 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 5 by removable storage 108 and non-removable storage 110.

Computing device 100 as used herein may be either a physical hardware device, a virtual device, or a combination thereof.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, Random Access Memory (RAM), Read-Only Memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 inter-connected by a network 118, as is shown in FIG. 5. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as universal serial bus (USB) flash drives, Secure Digital (SD) memory cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

The advantages of the inventive system and method are numerous. It is a hybrid approach based on local treatment and a server side platform, and it has a modularity that allows extensibility with the same hardware. Multiple measurements are taken in rapid periodicity (e.g., every 5 seconds) and a complete leak detection cycle is performed every hour so as to enable real time monitoring of a system. Beyond merely detecting leaks, the invention provides complete visibility on the operation of the installation via the monitoring of the operating parameters, the level of refrigerant, its behavior in the installation, etc. The invention enables centralized monitoring of multiple installations on a single web application, with alerts, reminders, and advice, and the like. Energy monitoring, with an additional module, enables monitoring the operation of compressors and alerts in case of risk of failure. Advanced ergonomics of the web application include remote actions to facilitate diagnostics, avoid unnecessary travel, and simplify the management of a fleet of refrigeration installations.

The centralized and remote monitoring brings an answer to the lack of manpower on the market. It avoids unnecessary travel by offering the possibility of accessing the information of the installation from a computer or a smartphone. The dashboard makes it easy to identify installations requiring priority intervention and to have a fine view of the level variations in the tank.

All the installations under management are visible on the platform, the equivalent of a technician on site at all times.

In terms of leak detection, continuous monitoring ensures that no leaks remain. Unlike a portable detector or room controller, no disturbances such as air currents affect the quality of the detection, which is done inside the installation.

Finally, indirect emissions are reduced thanks to energy monitoring. An enthalpic diagram (see FIG. 4B) allows the behavior of the fluid to be traced in real time in order to adjust the settings. This tool allows to optimize the operation of the plant and to have not a calculated Coefficient of Performance (|Q|/W) but a real and detailed Coefficient of Performance.

The benefits for the environment are major: the detection of leaks allows to drastically reduce the leakage rate of the installations and the energy monitoring and advice to reduce the final energy consumption.

Finally, the web platform offers a shared view to refrigeration operators and installation owners, which is a real contribution to the implementation of maintenance contracts because it allows a more detailed monitoring of systems, especially in the case of retrofit where the performance of two refrigerants can be compared.

The invention is not limited to the above description. For example, the data on the operation of installations provides new indicators for the profession, and the system enables the proposal of new indicators and to give installations the opportunity to propose their own. The invention also offers access to external players such as energy management platforms that work for large supermarkets performance indicators.

It should be understood that, in the context of this disclosure, "at least one of" followed by a series of elements means any one of the elements in the series or any combination of the elements in the series, including all of the elements. So, for example, a recitation of "at least one of A, B, or C" means any of A, B, C, A+B, A+C, B+C, or A+B+C.

Having described certain embodiments of the invention, it should be understood that the invention is not limited to the above description or the attached exemplary drawings. Rather, the scope of the invention includes any equivalents thereof as would be appreciated by one of ordinary skill in the art.

What is claimed is:

1. A system for remote monitoring of refrigeration systems to detect leaks of refrigerant, comprising:
a local monitoring station, having at least one sensor configured to be in communication with a refrigeration system having refrigerant, said sensor measuring at least one parameter of the refrigeration system, said at least one sensor measuring a quantity of refrigerant in the refrigeration system, said local monitoring station further having at least one local processor;
at least one server, remote from and in communication with said local monitoring station and accessible by at least one user communication device via communication channels; and
software residing at least partially on said local monitoring station, wherein said at least one local processor is configured to execute said software to cause said local monitoring station to:
record data from said at least one sensor periodically to generate recorded sensor data;
collect said recorded sensor data over time to generate collected sensor data;
aggregate refrigerant levels over a plurality of time periods of differing sizes, wherein shorter of said time periods are used to identify leaks with a lower amplitude, and wherein longer of said time periods are used to identify leaks with a higher amplitude;

determine via at least one algorithm, using said collected sensor data, whether a refrigerant leak is occurring in the refrigeration system being monitored to thereby generate a state of the refrigeration system; and communicate said state of the refrigeration system to said at least one server.

2. A system for remote monitoring of refrigeration systems to detect leaks of refrigerant according to claim 1, said at least one server sending at least one message to the at least one user communication device via the communication channels, the at least one message pertaining to said state of the refrigeration system.

3. A system for remote monitoring of refrigeration systems to detect leaks of refrigerant according to claim 1, said at least one sensor further comprising a weight sensor connected to an external column in fluid communication with a main refrigerant tank, wherein a weight of the column is indicative of a refrigerant level in the main refrigerant tank, said at least one parameter comprising the weight of the column.

4. A system for remote monitoring of refrigeration systems to detect leaks of refrigerant according to claim 3, said weight sensor comprising a strain gauge.

5. A system for remote monitoring of refrigeration systems to detect leaks of refrigerant according to claim 3, wherein:
said at least one sensor further comprising a temperature sensor measuring a refrigerant output temperature of the main refrigerant tank; and
said software further causes said local monitoring station to:
determine a density of the refrigerant using the output temperature;
calculate a refrigerant height in the main refrigerant tank using at least column volume, column weight, and the density;
calculate a main refrigerant tank weight using tank type, the calculated refrigerant height, the density, and tank diameter; and
compare the calculated main refrigerant tank weight with a predetermined low-level limit.

6. A system for remote monitoring of refrigeration systems to detect leaks of refrigerant according to claim 5, wherein if the calculated main refrigerant tank weight is less than said predetermined low-level limit, a low-level alarm is sent from said local monitoring station to said server and thence to the at least one user communication device.

7. A system for remote monitoring of refrigeration systems to detect leaks of refrigerant according to claim 5, wherein said software further causes said local monitoring station to:
determine whether a slope of the collected sensor data over a time period calculated via a linear function is below a predetermined statistical threshold; and
send a statistical alarm from said local monitoring station to said server and thence to the at least one user communication device if the slope is below the predetermined statistical threshold.

8. A system for remote monitoring of refrigeration systems to detect leaks of refrigerant according to claim 1, for each of at least a plurality of said time periods, said software further causes said local monitoring station at least to determine at least one of the following a), b), or c):
a) whether a difference in refrigerant level between the start and the end of a given said time period is greater than a fixed threshold;
b) whether a difference in level between the start and the end of the period, and the relative maximum volume of a main refrigerant tank, is greater than a fixed threshold; or
c) whether a share of decline relative to all levels is greater than a fixed threshold; and
said software further causes said local monitoring station to determine d) that a drop in refrigerant level is not due to a point discontinuity,
wherein an alarm is generated if at least one of a)-c) and d) occur.

9. A method of remote monitoring of refrigeration systems to detect leaks of refrigerant, comprising the step of:
providing at least one sensor in communication with a refrigeration system having refrigerant;
measuring, via the sensor, at least one parameter of the refrigeration system including a quantity of refrigerant in the refrigeration system;
recording data from the at least one sensor periodically on a location monitoring station having at least one local processor, thereby generating recorded sensor data;
collecting the recorded sensor data over time on the local monitoring station, thereby generating collected sensor data;
aggregating refrigerant levels over a plurality of time periods of differing sizes via the local processor;
using shorter of the time periods to identify leaks with a lower amplitude;
using longer of the time periods to identify leaks with a higher amplitude;
determining via the local processor using at least one algorithm and using the collected sensor data whether a refrigerant leak is occurring in the refrigeration system being monitored, thereby generating a state of the refrigeration system;
communicating the state of the refrigeration system from the local monitoring station to at least one server; and
sending, from the at least one server, at least one message to at least one user communication device via communication channels, the at least one message pertaining to the state of the refrigeration system.

10. A method of remote monitoring of refrigeration systems to detect leaks of refrigerant according to claim 9, the at least one sensor including a weight sensor connected to an external column in communication with a main refrigerant tank, said measuring step further comprising the step of measuring a weight of the column, wherein the weight of the column is indicative of a refrigerant level in the main refrigerant tank.

11. A method of remote monitoring of refrigeration systems to detect leaks of refrigerant according to claim 10, wherein said measuring step further comprises the step of a temperature sensor measuring a refrigerant output temperature of the main refrigerant tank with a temperature sensor, said method further comprising the steps of:
determining a density of the refrigerant using the output temperature;
calculating the refrigerant height in the main refrigerant tank using at least column volume, column weight, and the density;
calculating a main refrigerant tank weight using tank type, the calculated refrigerant height, the density, and the tank diameter; and
comparing the calculated main refrigerant tank weight with a predetermined low-level limit.

12. A method of remote monitoring of refrigeration systems to detect leaks of refrigerant according to claim 11, further comprising the step of sending a low-level alarm from the local monitoring station to the server and thence to at least one user communication device if the calculated main refrigerant tank weight is less than said predetermined low-level limit.

13. A method of remote monitoring of refrigeration systems to detect leaks of refrigerant according to claim 11, further comprising the steps of:
determining whether a slope of the collected sensor data over a time period calculated via a linear function is below a predetermined statistical threshold; and
sending a statistical alarm from the local monitoring station to the server and thence to the at least one user communication device if the slope is below the predetermined statistical threshold.

14. A method of remote monitoring of refrigeration systems to detect leaks of refrigerant according to claim 9, wherein for each of at least a plurality of the time periods, said method further comprises:
at least one of steps a), b, or c):
a) determining whether a difference in refrigerant level between the start and the end of a given said time period is greater than a fixed threshold;
b) determining whether a difference in level between the start and the end of the period, and the relative maximum volume of the main refrigerant tank, is greater than a fixed threshold; or
c) determining whether a share of decline relative to all levels is greater than a fixed threshold;
said method further comprising the steps of:
d) determining that a drop in refrigerant level is not due to a point discontinuity; and
e) generating an alarm if at least one of a)-c) and d) occur.

15. A system for remote monitoring of refrigeration systems, comprising:
a local monitoring station, having at least one sensor configured to be in communication with a refrigeration system having refrigerant, said at least one sensor measuring at least a quantity of refrigerant in the refrigeration system including a refrigerant output temperature of a main refrigerant tank of the refrigeration system, said local monitoring station further having at least one local processor;
at least one server, remote from and in communication with said local monitoring station and accessible by at least one user communication device via communication channels, said server having at least one remote processor; and
software residing at least partially on at least one of said local monitoring station or said server, wherein at least one of said at least one local processor or said least one remote processor are configured to execute said software to cause said system to:
record data from said at least one sensor periodically to generate recorded sensor data;
collect said recorded sensor data over time to generate collected sensor data;
determine a density of the refrigerant using the output temperature;
calculate a refrigerant height in the main refrigerant tank using at least the density;
calculate a main refrigerant tank weight using tank type, the calculated refrigerant height, the density, and tank diameter; and
compare the calculated main refrigerant tank weight with a predetermined low-level limit;
determine via at least one algorithm, using said collected sensor data, a status of said at least one parameter to thereby generate a state of the refrigeration system; and
communicate said state of the refrigeration system to the at least one user communication device.

16. A system for remote monitoring of refrigeration systems according to claim 15, said at least one server sending at least one message to the at least one user communication device via the communication channels, the at least one message pertaining to said state of the refrigeration system.

17. A system for remote monitoring of refrigeration systems according to claim 15, said at least one sensor further comprising a weight sensor connected to an external column in fluid communication with the main refrigerant tank, said weight sensor measuring the weight of the column, wherein a weight of the column is indicative of a refrigerant level in the main refrigerant tank.

18. A system for remote monitoring of refrigeration systems according to claim 15, wherein if the calculated main refrigerant tank weight is less than said predetermined low-level limit, a low-level alarm is sent from at least one of said local monitoring station or said server and thence to the at least one user communication device.

19. A system for remote monitoring of refrigeration systems according to claim 15, wherein said software further causes said system to:
determine whether a slope of the collected sensor data over a time period calculated via a linear function is below a predetermined statistical threshold; and
send a statistical alarm from at least one of said local monitoring station or said server and thence to the at least one user communication device if the slope is below the predetermined statistical threshold.

20. A system for remote monitoring of refrigeration systems according to claim 15,
wherein said software further causes said system to aggregate refrigerant levels over a plurality of time periods of differing sizes,
wherein shorter of said time periods are used to identify leaks with a lower amplitude, and
wherein longer of said time periods are used to identify leaks with a higher amplitude.

21. A system for remote monitoring of refrigeration systems according to claim 20, for each of at least a plurality of said time periods, said software further causes said system at least to determine at least one of the following a), b), or c):
a) whether a difference in refrigerant level between the start and the end of a given said time period is greater than a fixed threshold;
b) whether a difference in level between the start and the end of the period, and the relative maximum volume of a main refrigerant tank, is greater than a fixed threshold; or
c) whether a share of decline relative to all levels is greater than a fixed threshold; and
said software further causes said local monitoring station to determine d) that a drop in refrigerant level is not due to a point discontinuity,
wherein an alarm is generated if at least one of a)-c) and d) occur.

22. A method of remote monitoring of refrigeration systems, comprising the step of:
providing at least one sensor in communication with a refrigeration system having refrigerant;

measuring, via the at least one sensor, at least a quantity of refrigerant in the refrigeration system including a refrigerant output temperature of a main refrigerant tank of the refrigeration system;

recording data from the at least one sensor periodically on at least one of a location monitoring station having at least one local processor or at least one remote server in communication with the local monitoring station and having at least one remote processor, thereby generating recorded sensor data;

collecting the recorded sensor data over time on at least one of the local monitoring station and the at least one remote server, thereby generating collected sensor data;

determining a density of the refrigerant using the output temperature;

calculating the refrigerant height in the main refrigerant tank using at least the density;

calculating a main refrigerant tank weight using tank type, the calculated refrigerant height, the density, and the tank diameter; and comparing the calculated main refrigerant tank weight with a predetermined low-level limit;

determining via at least one of the local processor or the remote processor using at least one algorithm and using the collected sensor data a status of at least the main refrigerant tank weight, thereby generating a state of the refrigeration system; and sending, from at least one of the local monitoring station or the at least one server, at least one message to at least one user communication device via communication channels, the at least one message pertaining to the state of the refrigeration system.

23. A method of remote monitoring of refrigeration systems according to claim 22, the at least one sensor including a weight sensor connected to an external column in communication with a main refrigerant tank, said measuring step further comprising the step of measuring a weight of the column, wherein the weight of the column is indicative of a refrigerant level in the main refrigerant tank.

24. A method of remote monitoring of refrigeration systems according to claim 22, further comprising the step of sending a low-level alarm from at least one of the local monitoring station or the at least one remote server and thence to at least one user communication device if the calculated main refrigerant tank weight is less than said predetermined low-level limit.

25. A method of remote monitoring of refrigeration systems according to claim 22, further comprising the steps of:
determining whether a slope of the collected sensor data over a time period calculated via a linear function is below a predetermined statistical threshold; and
sending a statistical alarm from at least one of the local monitoring station or the at least one remote server and thence to the at least one user communication device if the slope is below the predetermined statistical threshold.

26. A method of remote monitoring of refrigeration systems according to claim 22, further comprising the steps of:
aggregating refrigerant levels over a plurality of time periods of differing sizes via at least one of the local processor or the remote processor;
user shorter of the time periods to identify leaks with a lower amplitude; and
using longer of the time periods to identify leaks with a higher amplitude.

27. A method of remote monitoring of refrigeration systems according to claim 26, wherein for each of at least a plurality of the time periods, said method further comprises:
at least one of steps a), b, or c):
a) determining whether a difference in refrigerant level between the start and the end of a given said time period is greater than a fixed threshold;
b) determining whether a difference in level between the start and the end of the period, and the relative maximum volume of the main refrigerant tank, is greater than a fixed threshold; or
c) determining whether a share of decline relative to all levels is greater than a fixed threshold;
said method further comprising the steps of:
d) determining that a drop in refrigerant level is not due to a point discontinuity; and
e) generating an alarm if at least one of a)-c) and d) occur.

* * * * *